July 31, 1956  HANS-JOACHIM M. FÖRSTER  2,756,616
SPEED CHANGE TRANSMISSION FOR MOTOR VEHICLES
Filed Sept. 5, 1951  10 Sheets-Sheet 6
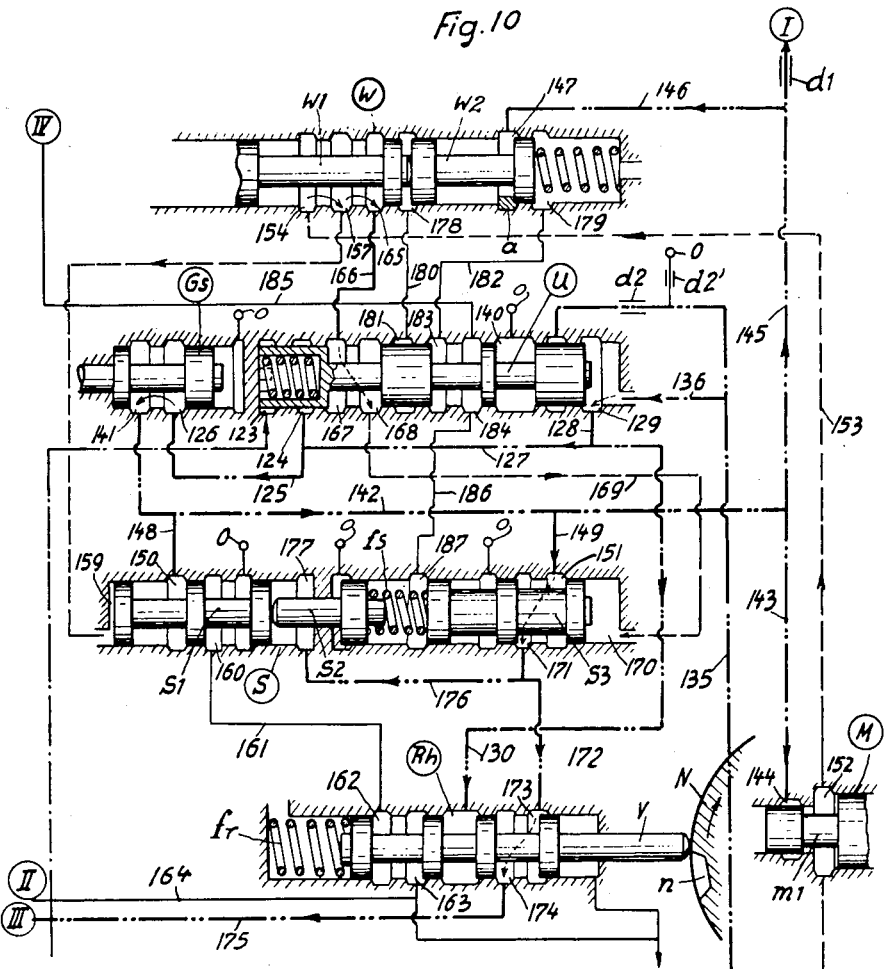
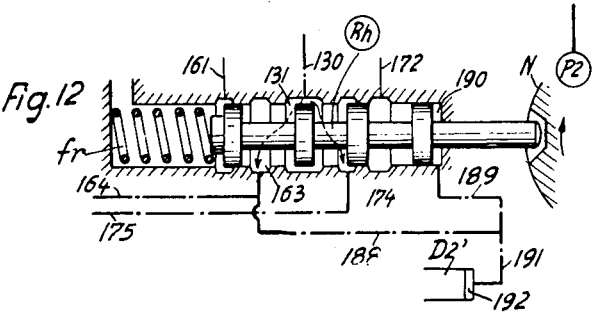
Inventor:
Hans-Joachim M. Förster
By Austin, Dicke, Wilhelm & Padten
ATTORNEYS

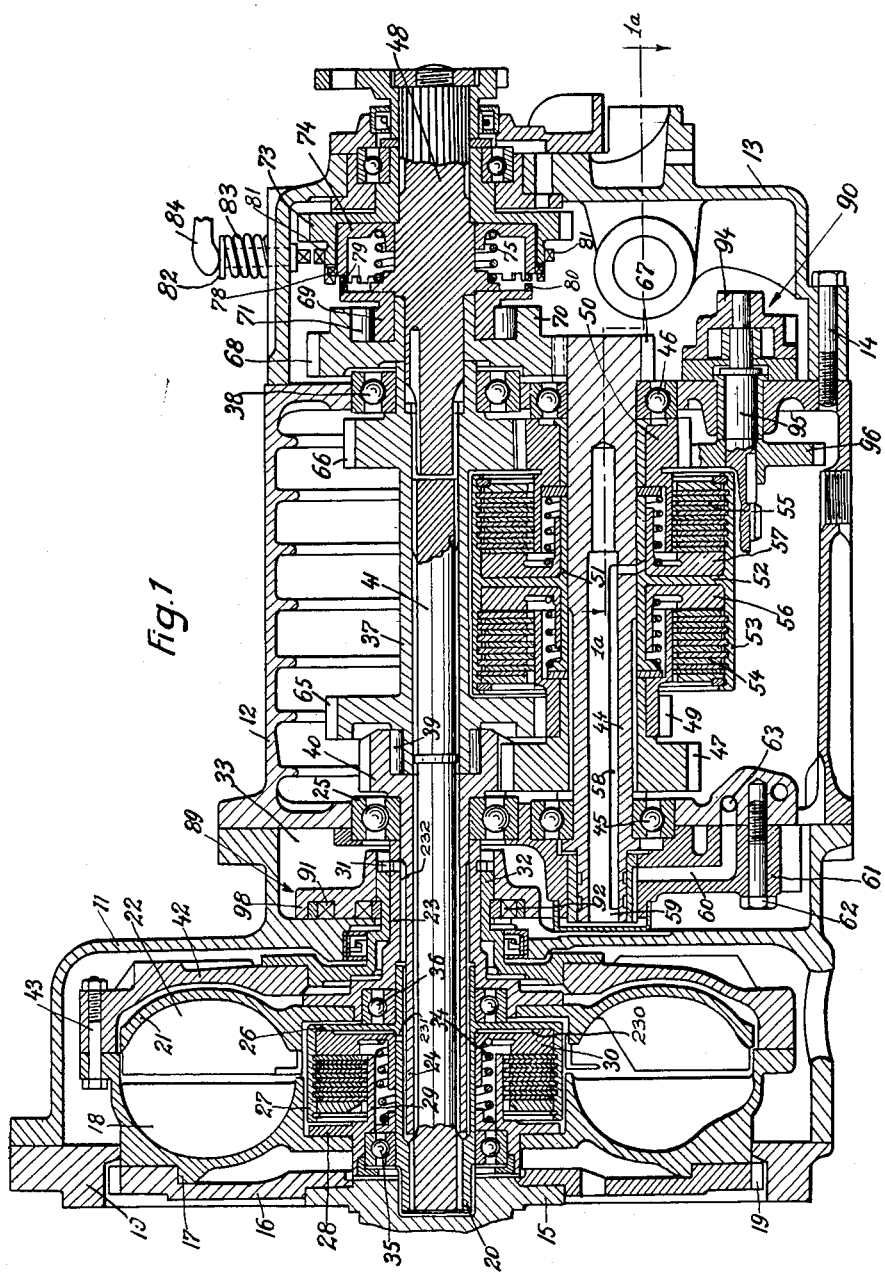

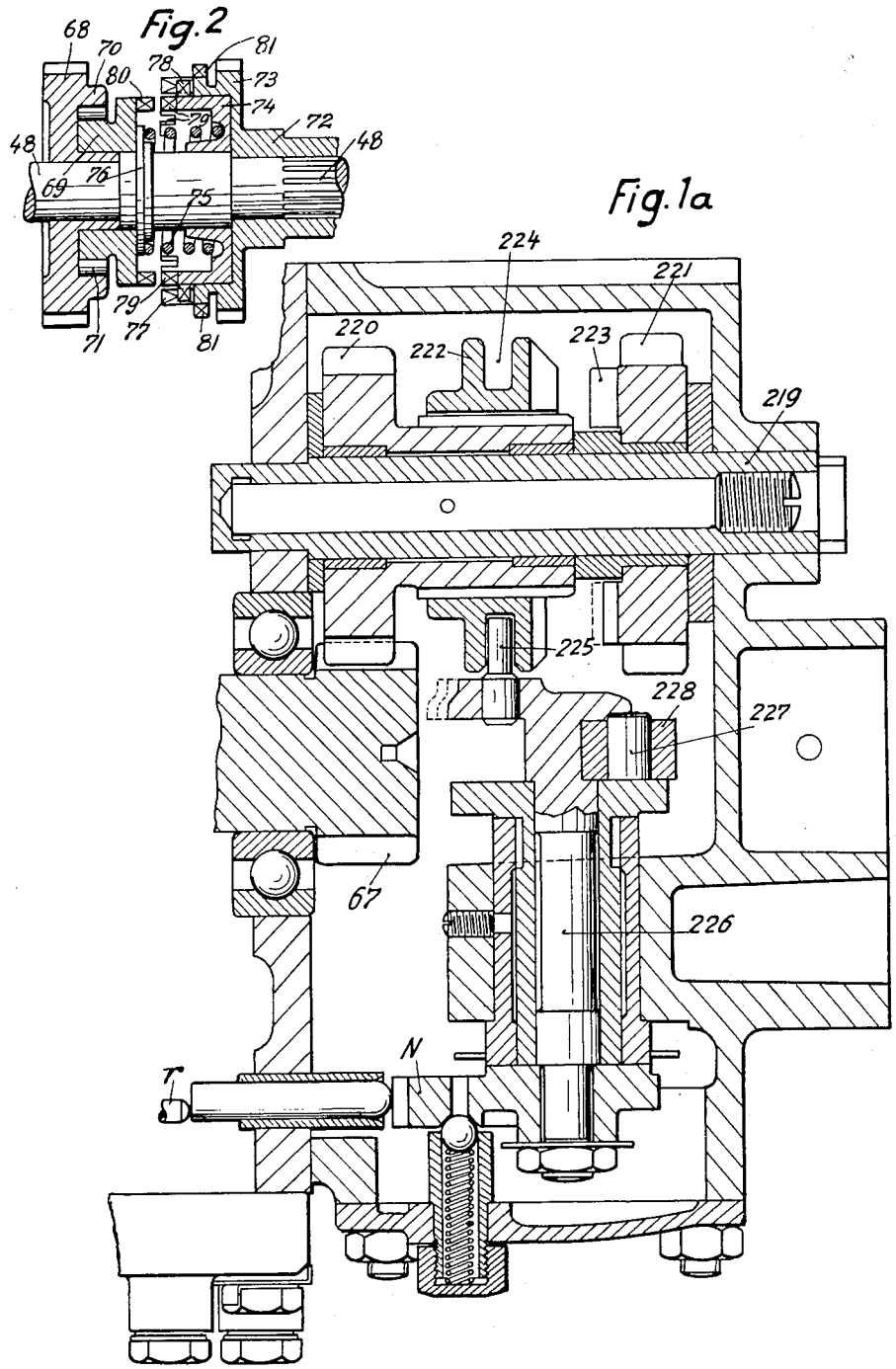

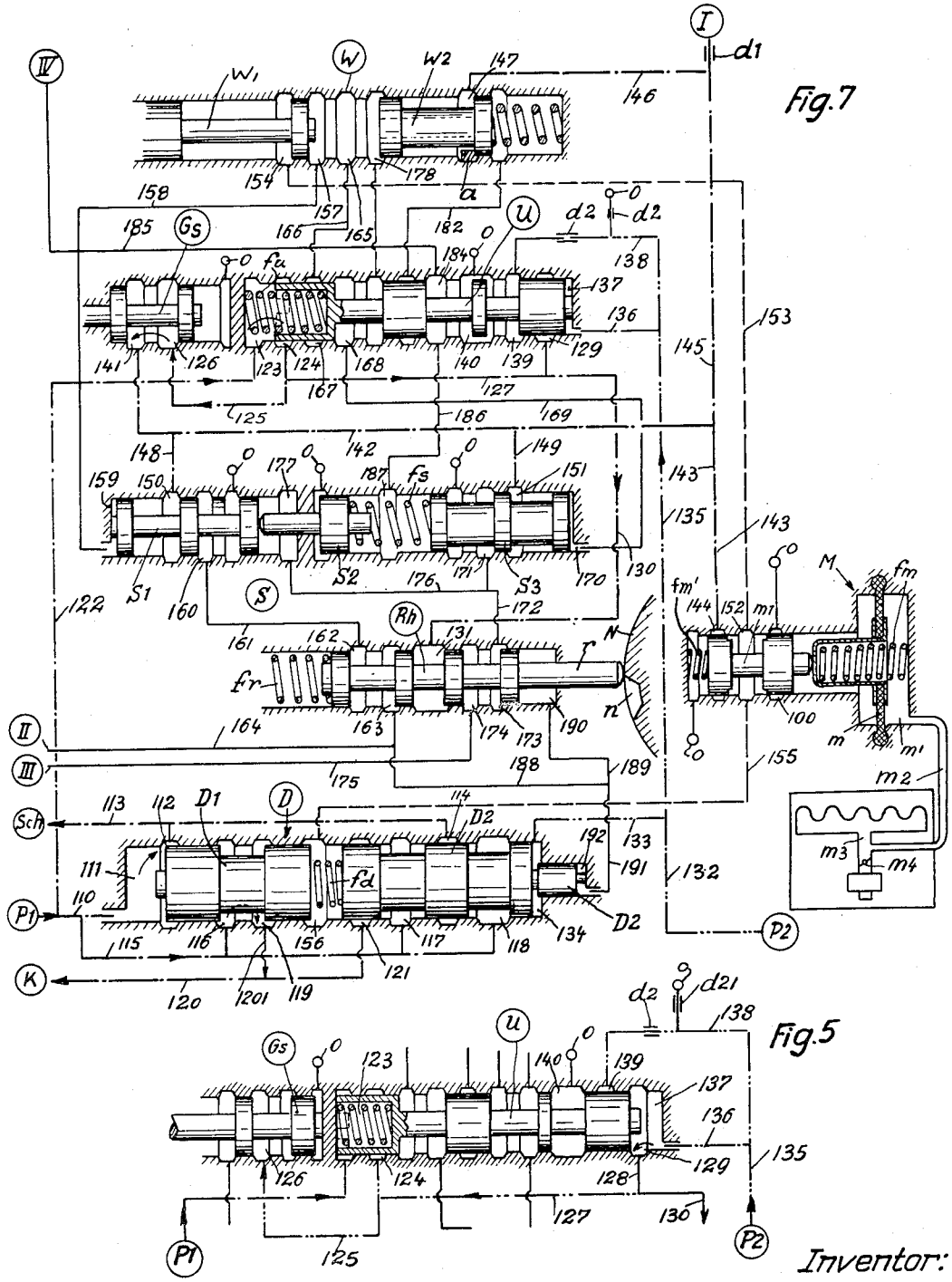

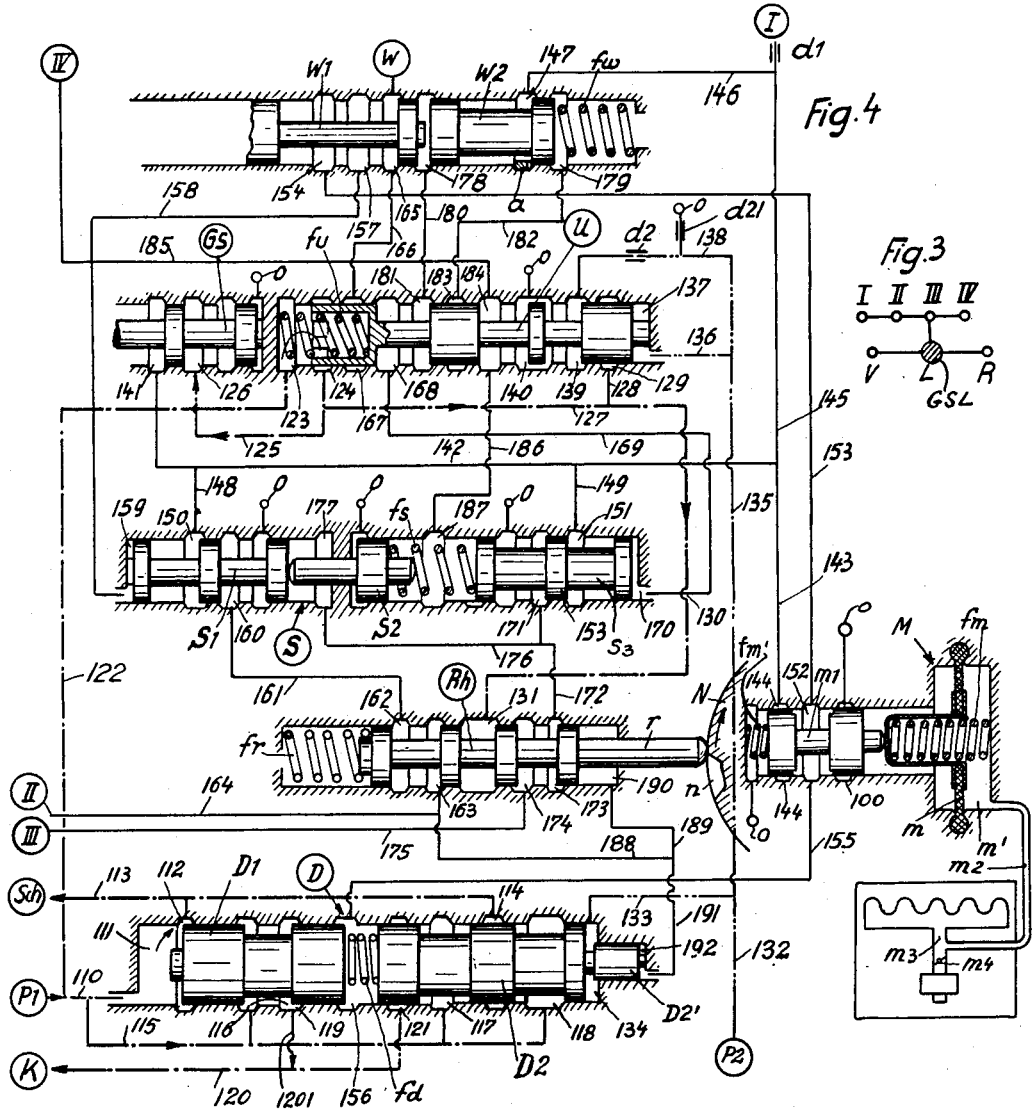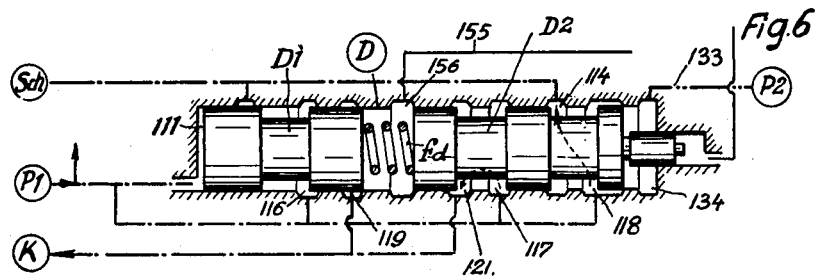

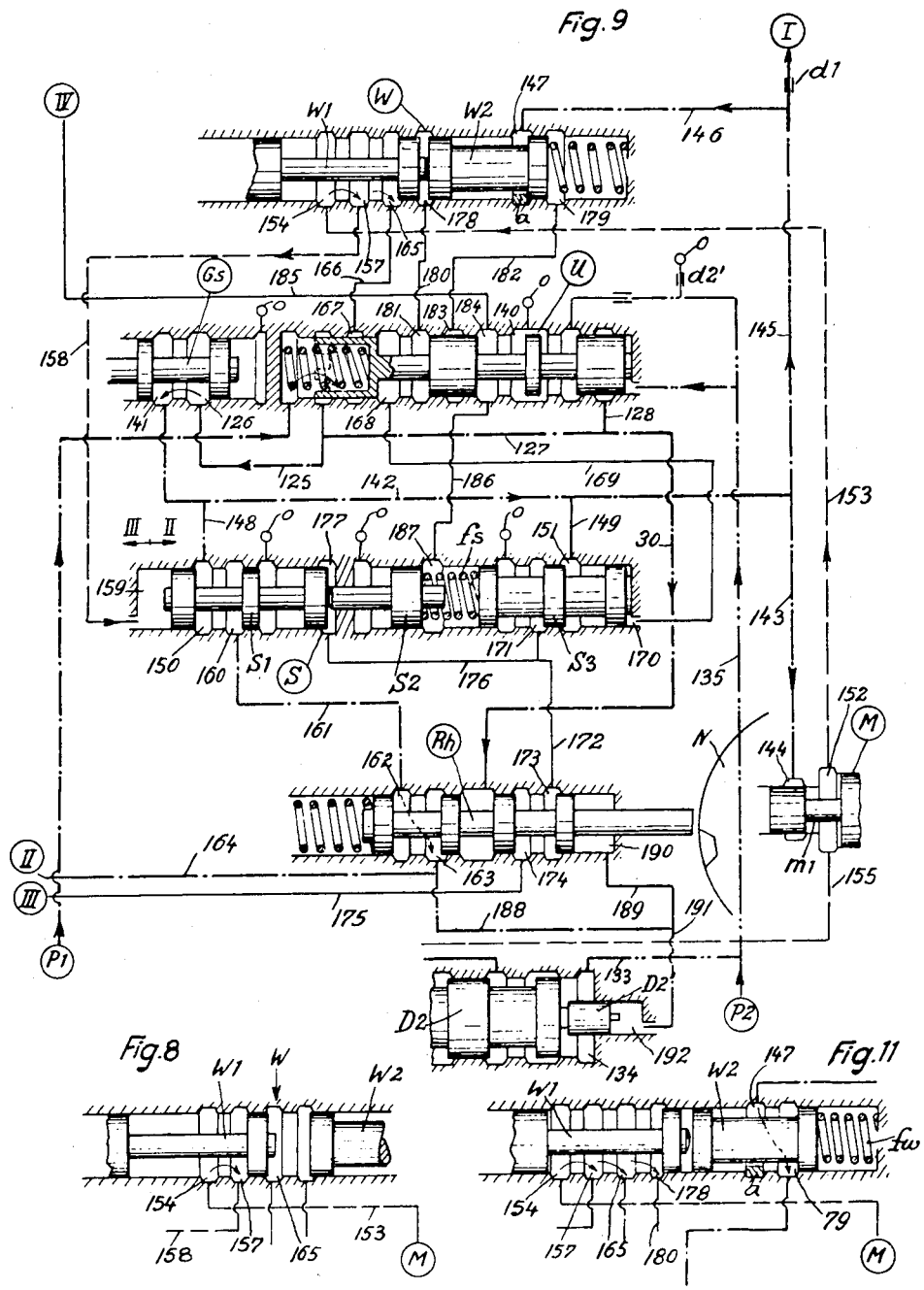

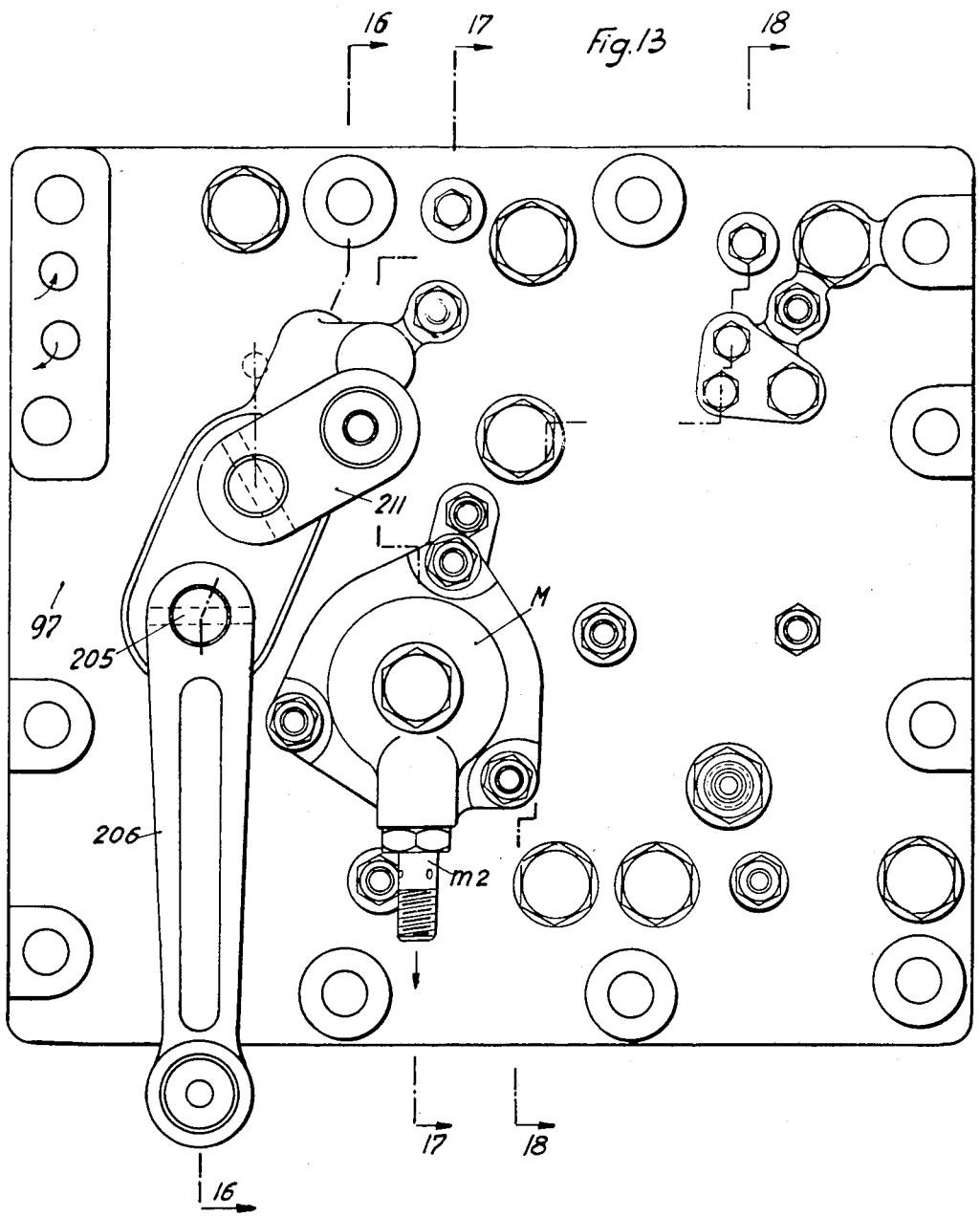

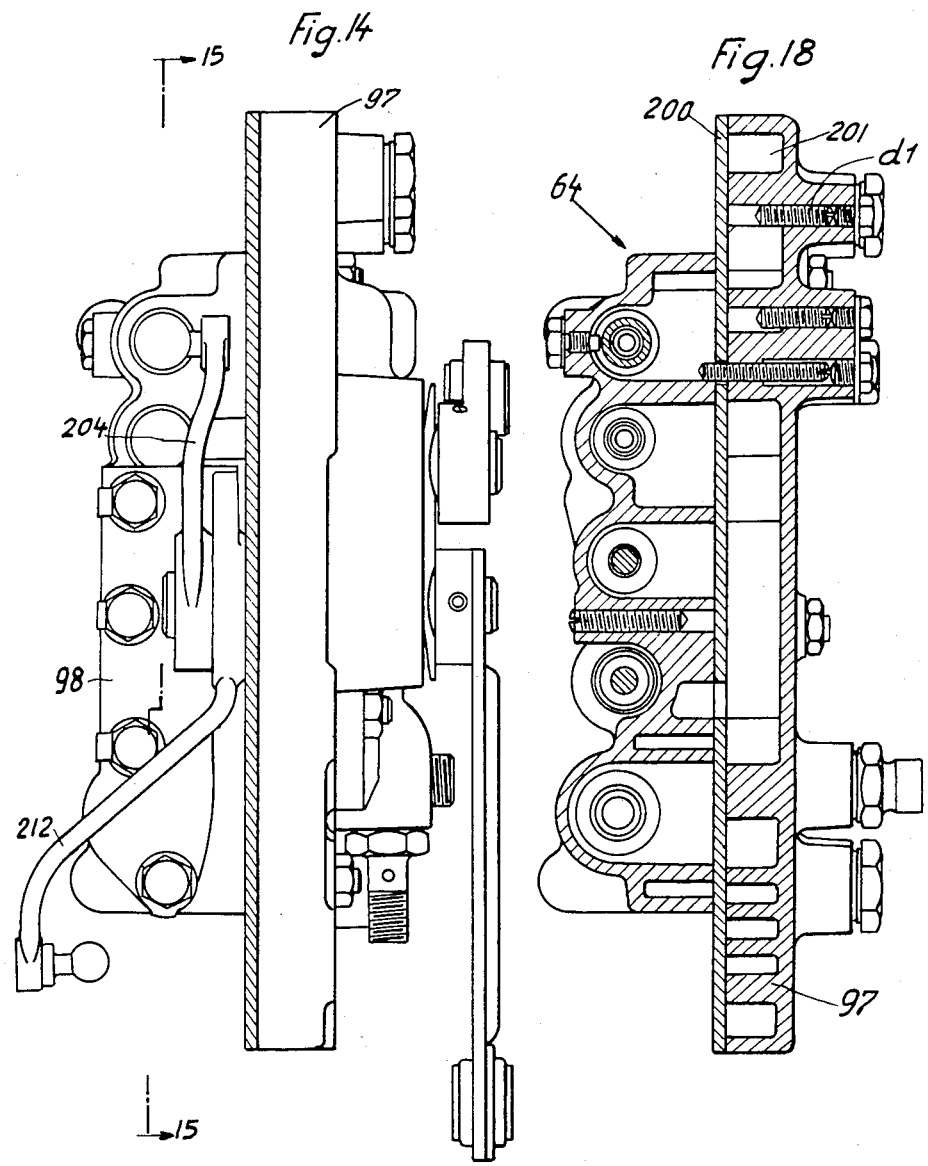

July 31, 1956 HANS-JOACHIM M. FÖRSTER 2,756,616
SPEED CHANGE TRANSMISSION FOR MOTOR VEHICLES
Filed Sept. 5, 1951 10 Sheets-Sheet 9

Inventor:
Hans-Joachim M. Förster
By Austin, Dicke, Wilhelm & Paelian
attorney

July 31, 1956   HANS-JOACHIM M. FÖRSTER   2,756,616
SPEED CHANGE TRANSMISSION FOR MOTOR VEHICLES
Filed Sept. 5, 1951   10 Sheets-Sheet 10
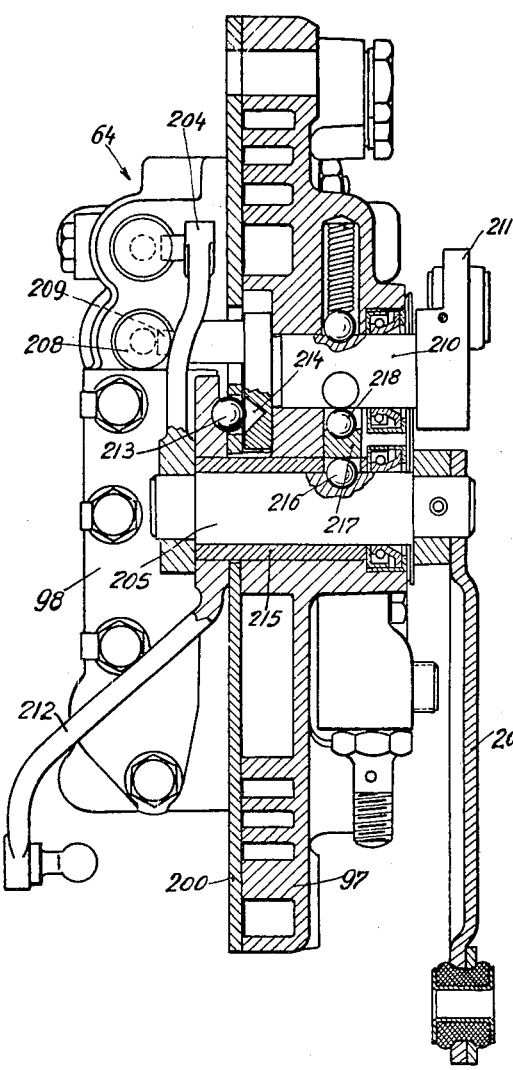
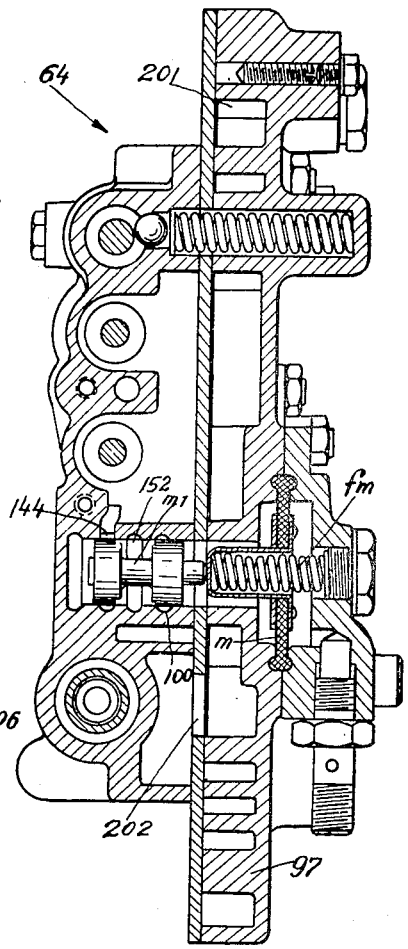
Inventor:
Hans-Joachim M. Förster
BY Austin, Dicke, Wilhelm, Paul
ATTORNEYS United States Patent Office 2,756,616
Patented July 31, 1956

2,756,616

SPEED CHANGE TRANSMISSION FOR MOTOR VEHICLES

Hans-Joachim M. Förster, Stuttgart-Bad Cannstatt, Germany, assignor to Daimler-Benz Aktiengesellschaft, Stuttgart-Unterturkheim, Germany Application September 5, 1951, Serial No. 245,131

38 Claims. (Cl. 74—732)

My invention relates to a speed change transmission for motor vehicles and, more particularly, to a transmission in which the gear shifting operations are performed by fluid pressure under a semi-automatic control in dependence on the speed of the vehicle and the position of a gear shift lever.

The objects of the invention are to provide a transmission for a motor vehicle that may be easily shifted by manipulation of a gear shift lever under fingertip control requiring little physical effort and short movements only;

to provide a transmission for motor vehicles which may be shifted from one gear to another by actuation of friction clutches irrespective of the position of the accelerator and without interruption of the traction power, and to minimize shocks incident to such gear shifting operation;

to provide a transmission that is so correlated to the control of the engine that the latter will gradually vary its speed within the interval between successive gear shifting conditions;

to provide a transmission which when shifted to direct gear, will establish a positive driving connection between the driving shaft and the outgoing driven shaft, whereas all other ratios of transmission will be transferred by a hydrodynamic clutch of the type permitting the engine to idle rather than stalling the engine when the outgoing driven shaft of the transmission is arrested, such as by stopping the vehicle;

to provide a transmission which when shifted to direct gear, will transfer the driving power from the driving shaft to the outgoing driven shaft by a friction clutch provided in addition to a hydrodynamic clutch operative to transfer the driving power when the transmission is shifted to lower forward gears;

to provide a transmission including a first gear element adapted to drive the vehicle in forward direction with the highest ratio of transmission and connected to the outgoing driven shaft by an overrunning clutch which permits such shaft to be driven in second gear or a higher gear without disabling said first gear element;

to provide a transmission which when being shifted to direct, will automatically include a hydrodynamic clutch in the power transmitting train between the driving shaft and the driven shaft when the speed of the vehicle drops below a certain limit, thereby preventing the motor from being stalled;

to further provide a transmission of such kind in which a gear shifting operation is automatically performed by fluid pressure when the speed of the vehicle drops below a certain limit or increases beyond a certain limit, said limits differing from one another;

to provide a transmission for a motor vehicle including a hydrodynamic clutch, a plurality of friction clutches and at least one toothed clutch connecting various elements of said transmission in which controlling means are provided permitting of a reliable, smooth and noiseless engagement and disengagement of the toothed clutch, irrespective of the small torque transferred by the hydrodynamic clutch when the vehicle is at rest, such control means eliminating the necessity of interposing a friction clutch between the hydrodynamic clutch and the toothed clutch;

to provide a speed change transmission shiftable by fluid under pressure in which such fluid is so controlled in dependence on the speed of the vehicle as to shift the transmission from one ratio of transmission to another ratio of transmission when the speed of the vehicle exceeds a certain limit, and will be shifted back from said other ratio to said first mentioned ratio when the speed drops below another limit which is higher than said first mentioned limit;

to provide a transmission including a plurality of friction clutches co-ordinated to different ratios of transmission, and a fluid pressure control for the clutches which in a gear shifting operation will engage the friction clutch co-ordinated to one ratio of transmission before disengaging the friction clutch co-ordinated to another ratio of transmission;

to provide a supply for control fluid under pressure that will function to supply the required control fluid for the transmission when the vehicle is at rest and the engine is running and when the motor has been stalled, but the vehicle is running;

to provide a transmission including a free-wheeling clutch between the outgoing driven shaft and gear elements driven in second gear or a higher gear, which free wheeling clutch will be operative to lock the vehicle against backward travel;

to provide a transmission in which friction clutches performing the gear shifting operation will be engaged by fluid pressure which is controlled in dependence on the driving torque produced by the engine in order to provide for an increased engaging force in the friction clutch, as the torque to be thereby transferred increases.

The invention will be described hereinafter by reference to a preferred embodiment thereof illustrated in the drawings. But it is to be understood that anyone skilled in the art may readily devise numerous modifications of such embodiment without departing from the scope of the invention.

Fig. 1 is a longitudinal section through a fluid controlled speed change transmission for a motor vehicle having four forward speeds and one reverse speed, Fig. 1a the partial section along line 1a—1a of Fig. 1.

Fig. 2 is a detail of Fig. 1 shown on an enlarged scale.

Fig. 3 is a diagram illustrating the relative positions to which the gear shift lever is settable.

Figs. 4, 5, 6, 7, 8, 9, 10, 11 and 12 are diagrammatic representations of the various control valves and of the conduits connecting same with each other and with the pumps and the various actuating cylinders incorporated in the transmission illustrated in Fig. 1.

More particularly,

Fig. 4 represents the condition of the control system when the transmission is set to neutral and the vehicle is at rest.

Fig. 5 shows the position of the valve called "route valve Gs" hereinafter and of the "shifting valve U" when the transmission is set to neutral and when the driven shaft of the transmission is rotating causing the secondary pump P2 to supply pressure fluid.

Fig. 6 illustrates the position the pressure controller D will assume whenever the pressure produced by the secondary pump P2 surpasses that of the primary pump P1.

Fig. 7 is similar to Fig. 4 illustrating the condition when the transmission is in first gear.

Fig. 8 illustrates the position the speed selector W will assume when the transmission is in second gear.

Fig. 9 illustrates the condition of the control system when the transmission is still set to second gear, the driven shaft rotating at a comparatively low number of revolutions while the third gear has been preselected.

Fig. 10 is similar to Fig. 9 illustrating the condition of the control system when the transmission has been shifted to the preselected third gear, the pressure controller D shown in Figs. 4 and 7 having been omitted.

Fig. 11 illustrates the position the speed selector will assume when the transmission is in fourth gear.

Fig. 12 illustrates the position of a valve called "reverse auxiliary valve R*h*" hereinafter in a transitional position when the transmission is shifted to reverse.

Fig. 13 is an elevation of a lateral cover plate of the transmission casing carrying the valve housing.

Fig. 14 is a side view of the cover plate with the valve housing viewed from the left of Fig. 13.

Figure 15:
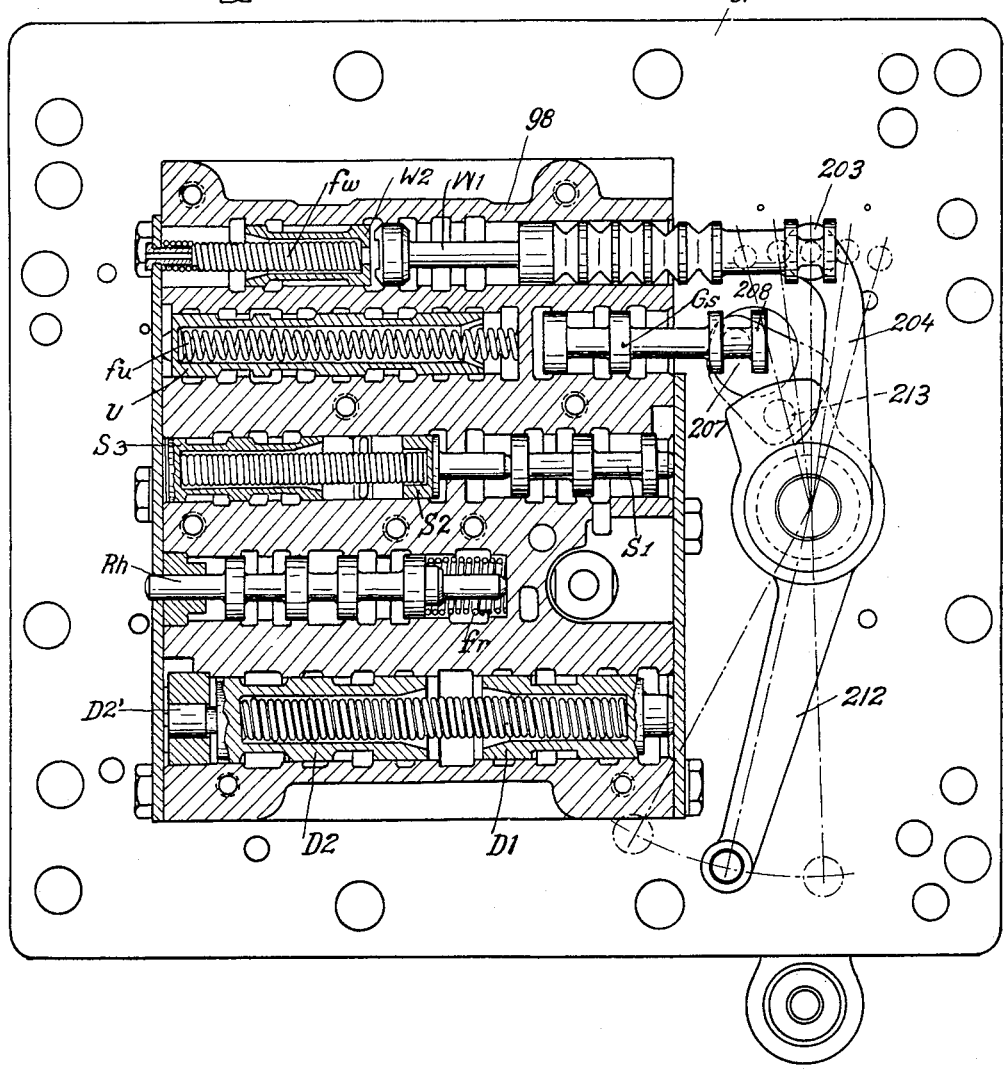

Fig. 15 is the section through the valve housing taken along the line 15—15 of Fig. 14.

Fig. 16 is the section taken along the line 16—16 of Fig. 13.

Fig. 17 is the section taken along the line 17—17 of Fig. 13.

Fig. 18 is the section taken along the line 18—18 of Fig. 13, and

Figure 19:
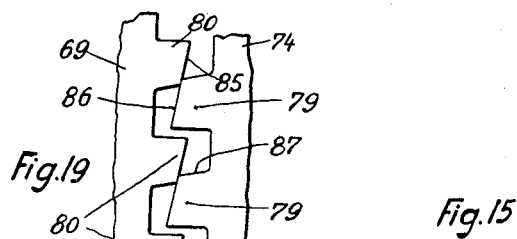

Fig. 19 is a diagrammatic development of the peripheries of the toothed elements of the reversing clutch showing a typical profile of the toothed elements.

In Fig. 1 I have illustrated a preferred embodiment of the novel fluid-controlled transmission, same being the transmission disclosed in the co-pending application Serial No. 227,846, filed on May 23, 1951, by myself jointly with others.

The casing of the transmission is substantially composed of four flanged sections 10, 11, 12 and 13, the section 10 being bolted in the customary manner to the crank casing of an internal combustion engine. The sections 10, 11 and 12 are suitably connected by screws, such as shown at 14.

The crankshaft of the internal combustion engine has a rear flange 15. A disk 16 is rigidly connected with the flange 15 by threaded bolts not shown and carries the driving section 17 of a hydrodynamic clutch of customary design. The section 17 has the shape of a hollow annulus provided with internal vanes 18. The members 16 and 17 constitute a flywheel of the internal combustion engine provided in the usual manner with teeth 19 for engagement with the starter pinion.

The driven section 21 of the hydrodynamic clutch formed by a supplemental semi-annulus having internal vanes 22 is mounted in the transmission co-axially to the clutch section 17. To this end, the section 22 is mounted on a hub member 23 seated on a hollow shaft 24 and splined therewith for common rotation, such hollow shaft 24 being journalled in a ball bearing 25 mounted in the front end wall of casing section 12. A friction clutch is provided for the purpose of positively connecting the section 17 of the hydrodynamic clutch with the outgoing shaft of the transmission referred to hereinafter. For this purpose, a sleeve 20 engages over the left end of the hollow shaft 24. This sleeve 20 is integral with a radial flange 26 which, in its turn, is integral with a cylindrical portion 27. The driving section 17 of the hydrodynamic clutch is connected for common rotation with a hub member 28 having a cylindrical sleeve 29 extending into the space embraced by the cylindrical portion 27 and surrounding the sleeve 20. A plurality of friction disks is splined on the sleeve 29 for common rotation therewith, but relative axial displacement. Interleaved with this set of disks is a second set of disks that has a splined connection with the inner face of the cylindrical portion 27. For the purpose of engaging the clutch, an annular piston 30 is snugly fitted into the space embraced by the sleeve 20 and the cylindrical portion 27 and is provided with a flat recess 230 on its right that communicates with radial bores 231 provided in the sleeve 20 close to the flange 26, as will appear from Fig. 1. Such radial bores 231 in turn communicate through longitudinal grooves 232 on the outside of the hollow shaft 24 with radial ports 31 provided in the hub member 23 and in a surrounding bushing 32. The ports 31, in their turn, communicate with the space 33 provided in the casing section 11. When fluid under pressure is admitted to the chamber 33, it will enter through the ports 31, the longitudinal grooves of the hollow shaft 24 and the radial bores to the recess provided on the right hand face of piston 30 and will urge the latter to the left to thereby compress the two interleaved sets of friction disks, whereby the driving section 17 of the hydrodynamic clutch will be connected for common rotation with the sleeve 20. When chamber 33 is relieved of the fluid pressure, a biassed helical spring 34 inserted between the sleeves 20 and 29 will restore the piston 30 to the position shown to thereby release the sleeve 20 from the clutch section 17. The sleeve 20 is journalled by means of a ball bearing 35 in the hub member 28 of the driving section 17 of the hydrodynamic clutch and by means of a ball bearing 36 within the driven section 22 of the hydrodynamic clutch.

In the section 12 of the transmission casing there is provided a hollow shaft 37 co-axially with respect to the sleeve 20, one end of the shaft 37 being journaled by a ball bearing 38 within the right hand end wall of the section 12 of the casing, whereas the other end of shaft 37 is journalled by means of anti-friction rollers 39 within a gear 40 integral with the hollow shaft 24. Both the sleeve 20 and the hollow shaft 37 are splined on their inside and engage with splined heads of a shaft 41 of spring steel which will thus resiliently connect the sleeve 20 and the hollow shaft 37.

An annular cover plate 42 which is attached to the peripheral flange of the clutch section 17 by screws 43 is also connected to a flange of the bushing 32 for common rotation therewith.

Extending parallel to and beneath the hollow shaft 37 there is mounted in the casing section 12 a second shaft 44 journalled by means of ball bearings 45 and 46 in the end walls of the casing section 12. A gear 47 permanently meshing with the gear 40 is fixed on shaft 44 so that the latter may be driven by the crankshaft of the engine via the elements 15, 16, 17, 21, 23, 20, 40 and 47 provided that the annular working space of the hydrodynamic clutch is supplied with fluid. Three pairs of gears having different ratios of transmission are provided for driving the outgoing shaft 48 of the transmission from the shaft 44 as will now be described.

Rotatably mounted on the hub portion of gear 47 is a gear 49 which is adapted by a multi-friction disk clutch to be clutched to the shaft 44 for common rotation therewith. Moreover, a gear 50 is freely rotatably mounted on shaft 44 adjacent to the ball bearing 46 and is adapted to be clutched to the shaft 44 by another multifriction disk clutch. Both multi-friction disk clutches co-ordinated to the gears 49 and 50 are similar to the disk clutch encased in the cylindrical portion 27 and, therefore, a brief discussion will suffice. A sleeve 51 is mounted on shaft 44 and connected therewith for common rotation. The sleeve 51 has a radial flange 52 integral with a cylinder 53 co-axially disposed with respect to the shaft 44 on either side of the radial flange 52. The cylinder 53 accommodates two pairs of interleaved sets of friction disks, one pair being denoted at 54 and the other pair of sets at 55. One set of the pair 54 is splined on a hub portion of gear 49 extending into the cylinder 53, while the other set is connected with the cylinder 53 for common rotation. Similarly, one set of the pair of sets 55 of friction disks is mounted on a hub portion of the gear 50 for common rotation therewith, while the other set has a splined connection with the cylinder 53. An annular piston 56, or 57 respectively, snugly fitted in the space between the sleeve 51 and the cylinder 53 may be operated by fluid pressure contrary to the effect of a restoring spring to compress the disks of one set and the disks of the other set of the pair of sets for the purpose of engaging the clutch. In this manner, each of the two gears 49 and 50 may be individually clutched to the shaft 44 for common rotation. Helical springs similar to the spring 34 are provided for restoring the pistons 56 and 57 to the position shown when the fluid pressure ceases to thereby disengage the multi-disk clutches.

For the purpose of conducting the fluid into the space between the flange 52 and the piston 57 a conduit is provided by a longitudinal groove 58 cut in a rod 59 inserted in a longitudinal bore of shaft 44. The groove 58 communicates through registering radial bores of shaft 44 and sleeve 51 with the space between piston 57 and flange 52, and the groove 58 also communicates through radial ports in shaft 44 with a radial conduit 60 in a housing member 61 which is attached to the left end wall of casing section 12 by screws, such as 62. A conduit 63 provided in the wall of casing section 12 communicates with the conduit 60 and with appropriate conduits in a valve housing indicated by 64 as a whole in Figs. 14 to 18 as will be described hereinafter. In a similar manner not shown in detail, the space between piston 56 and the flange 52 is connected with the valve housing 64.

It will be noted from Fig. 1 that the dimensions of the three multi-disk clutches are identical and that their elements are thereby mutually interchangeable.

The hollow shaft 37 is integral with two gears 65 and 66. The gear 65 is in permanent mesh with the gear 49, whereas the gear 66 is in permanent mesh with the gear 50. The hollow shaft 37 is keyed to the outgoing shaft 48 of the transmission for common rotation therewith.

The shaft 44 extends into the casing section 13 and on its free end is formed with an integral pinion 67 which permanently meshes with a spur gear 68 freely rotatably mounted within the housing section 13 on the outgoing shaft 48 of the transmission.

A clutch member 69, more clearly illustrated in Fig. 2, is freely rotatably mounted on a hub portion of gear 68 and is surrounded by a cylindrical flange 70 integral with the gear 68. A free-wheeling clutch or one-way clutch is constituted by the external flange 70 and the internal clutch member 69 and by clamping rollers 71 inserted therebetween in a manner well known in the art, it being understood that the opposed faces of the members 70 and 71 are recesses so as to form pockets accommodating the clamping rollers 71 permitting the latter to roll freely upon relative rotation of the two clutch members in one direction and to be firmly clamped in position upon a tendency of the clutch members to relatively rotate in the opposite sense.

The member 69 may be connected with the shaft 48 for common rotation under the control of fluid pressure. For this purpose, the hub portion 72 of a gear 73 is splined on the end of shaft 48 for common rotation therewith. The left face of the gear 73 has an annular recess snugly accommodating an annular piston 74 resiliently held in the position shown in Fig. 2 by a helical spring 75 which bears against the piston 74 and a collar 76 integral with shaft 48. The left end face of gear 73 has axially extending clutch teeth 77 which are in permanent engagement with clutch teeth 78 provided on the periphery of the piston member 74 near the left edge thereof. In this manner, the piston member 74, while slidable in the recess of gear 73, is permanently connected therewith for common rotation. While the set of teeth 78 extends outwardly from the member 74, a second set of teeth 79 is so provided on the piston member 74 as to extend axially and as to be adapted, upon movement of piston 74 to the left, to engage clutch teeth 80 provided on the clutch member 69. Therefore, when fluid pressure will be admitted to the space between piston 74 and gear 73 through a suitable conduit formed by communicating bores in casing section 13 and gear 73, the teeth 79 will engage the teeth 80 and will thus render the free-wheeling clutch 69, 70, 71 operative to connect gear 68 with the outgoing shaft 48 permitting the outgoing shaft 48 to be driven by the gear 68 when the transmission is shifted to first gear, but to overtake the slowly revolving gear 68 when the shaft 48 is driven by either the pair of gears 50, 66 or the pair of gears 49, 65.

The gear 73 is finally provided with a peripheral set of teeth 81 for engagement with the inner end of a detent member 82 which is normally held by a spring 83 in disengaged position shown in Fig. 1, but may be depressed by a lever 84 to engage the teeth 81 for the purpose of positively arresting the outgoing shaft 48 and to thereby lock the driven wheels of the vehicle when parked.

The gear 73 is used for driving the car in reverse. For this purpose, an auxiliary shaft 219, Fig. 1a, extends parallel to shaft 48 and rotatably carries two gears 220 and 221. The gear 220 is in permanent mesh with pinion 67 and has a splined hub on which a toothed clutch member 222 is slidably mounted and adapted to be shifted into engagement with clutch teeth 223 provided on the side face of gear 221. The clutch member 222 has a peripheral groove 224 which is engaged by a crank pin 225 of a horizontal crankshaft 226 extending at right angles to shaft 219. The shaft 226 has a downwardly extending arm not shown which is connected by a link to an arm 212 shown in Fig. 16 which is rocked for the purpose of shifting the transmission into reverse. When that happens, crank arm 225 is turned shifting clutch member 222 into engagement with the teeth 223 of gear 221. The embodiment shown in Fig. 1a differs from that shown in Fig. 1 in that the detent member 82 is mounted beneath gear 73 and is pushed into engagement with the teeth 81 by a roller 228 mounted on another crank pin 227 of crankshaft 226, when shaft 226 is turned in a direction opposite to that engaging the reversing clutch 223, 224. Moreover, the crankshaft 226 has a cam N to be referred to later in connection with Fig. 4. Preferably, the two gears 220, 221 mounted on the auxiliary shaft 219 and the gears 67, 68 and 73 have helical teeth guaranteeing a noiseless operation. Gears 221 and 73 are in mesh.

From the above explanation it will be readily understood that when the hydrodynamic clutch is supplied with fluid, it will drive the hollow shaft 24 and, through the pair 40, 47 of gears, the shaft 44 and the latter by its pinion 67 will impart slow revolution in forward direction to the gear 68. This gear takes along the clutch member 69 and, provided fluid pressure acts on piston 74 as in first gear, drives the outgoing shaft 48. When, however, the shaft 48 is driven at a higher speed, it may freely overtake the gear 68 in forward direction of rotation.

As shown in Fig. 19, the clutch teeth 79 and 80 are preferably beveled both in their front faces 85 and 86 and at their sides 87 and 88 for the purpose of facilitating the engagement thereof upon application of fluid pressure to the piston 74, and for the purpose of facilitating the release of the clutch teeth upon removal of the fluid pressure. In this manner, the teeth may be disengaged while still under load.

Fluid under pressure for the operation of the pistons 30, 56, 57 and 74 is preferably supplied by two gear pumps. One gear pump referred to as the "primary gear pump 89" hereinafter is operated by the engine, whereas the other gear pump referred to as the "secondary gear pump 90" hereinafter is driven from the outgoing shaft 48 of the transmission. In this manner, fluid pressure will be available when the engine is running while the vehicle is at rest, and when the vehicle is running while the engine is at rest.

The primary gear pump 89 comprises an annular internal gear 91, a gear 92 mounted in mesh therewith in fixed position on the bushing 32 and a housing plate 93 mounted on a transverse partition of casing section 11 and provided with suitably shaped recesses into which the gears 91 and 92 fit snugly.

The secondary gear pump 90 is constituted by a pair of meshing spur gears encased in a housing 94 which is mounted on the right hand end wall of casing section 12, one gear of the pair being fixed to a shaft 95 which is journalled in a bore of such end wall and carries a gear 96 fixed to it permanently meshing with gear 50. By the shaft 95 the speedometer of the vehicle may be operated.

When the transmission is set to first gear, second gear or third gear, power is transmitted to the outgoing shaft 48 from the shaft 44 which, in its turn, is driven through the pair of gears 40, 47 and the hydrodynamic clutch 17, 21. In first gear, the pinion 67 will be operative to drive the outgoing shaft 48. In second gear, the outgoing shaft 48 will be driven by the pair of gears 49 and 65. In third gear, the outgoing shaft 48 will be driven by the pair of gears 50 and 66.

It will be noted that the three pairs of gears 40, 47, 50, 66 and 67, 68 are mounted in immediate proximity to the ball bearing 25, or 38 respectively, whereby a particularly noiseless operation is ensured. Moreover, the pair of gears 49, 65 are mounted directly adjacent to the pair of gears 40, 47 thus assuring a noiseless operation in second gear. As a result of the provision of pinion 67 on the free end of shaft 44, the distance of the bearings 45 and 46 can be made comparatively short notwithstanding the interposition therebetween of the friction clutches 54, 55. When the various pistons are in the position illustrated in Fig. 1, the transmission is in its neutral condition. By actuation of piston 74 the transmission is shifted into first gear in which the outgoing shaft 48 is driven via the elements 15, 16, 17, 21, 23, 24, 40, 47, 67, 68, 71, 69, 74, 73. As soon as in addition to piston 74 either one of the two pistons 56 and 57 is actuated by shifting the transmission into second or third, the outgoing shaft 48 will be driven from shaft 44 through the pair of gears 49, 65 or through the pair of gears 50, 66. In that event, the shaft 48 and the clutch member 69 rotating therewith will overtake the slowly revolving gear 68, but the latter will become operative again automatically upon restoration of the actuated piston 56, or 57 respectively, by the associated spring upon removal of the fluid pressure.

When the transmission is shifted to fourth gear, fluid pressure will be supplied to piston 30 whereby the outgoing shaft 48 will be operated via the elements 15, 16, 17, 28, 27, 20, 41, 37. In this condition of the transmission the hydrodynamic clutch 17, 21 is no longer operative. Therefore, the transmission will operate at a high efficiency when shifted to fourth gear.

When the transmission is shifted to reverse, fluid pressure will be removed from piston 74 and the gear 73 will be operated by the pinion 67 through the auxiliary shaft 219, Fig. 1a, in reverse direction while the clutch teeth 79 and 80 are disengaged. In first, second, third and fourth gear fluid under pressure will be admitted to the piston 74 and will engage the clutch teeth 79 and 80.

As a result, the vehicle will be automatically locked against rolling downhill by action of the one-way clutch 69, 70, 71 as long as one of the disk clutches 54 and 55 is engaged. This is a result of the double transmission through the pair of gears rendered effective by the disk clutch and through the pair of gears 67 and 68, the shaft 48 being unable to overtake gear 68 in rearward direction.

When it is desired to safeguard the vehicle against rolling downhill when parked, the detent member 82 must be put in operation.

From the foregoing description it will be appreciated that my novel transmission is of excellent ruggedness, simplicity and efficiency and lends itself to easy fluid control by the actuation of a plurality of pistons. Moreover, the operation of the transmission is extremely noiseless. The various elements are mounted in compact relative location so that the transmission requires but little space.

I shall now describe a preferred embodiment of the means that may be used for proper operation of the pistons 30, 56, 57 and 74 under control of a gear shift lever mounted on the steering wheel in the customary manner.

An opening provided in a side wall of the section 12 of the transmission casing is closed by a cover plate 97 shown in Figs. 13 to 18. On the inside of the cover plate 97 a valve housing 98 is mounted containing a plurality of piston valves slidably accommodated in parallel bores. The various ports to be described hereinafter which are controlled by the piston valves are included in a system of conduits including those supplying pressure oil to the pistons 74, 56, 57 and 30 co-ordinated to the first, second, third and fourth gear setting of the transmission.

The main gear shift lever GSL mounted in the customary manner on the steering column may be rocked within an upper plane to be set to any one of four positions diagrammatically indicated in Fig. 3 at I, II, III and IV and, when set to the position III, may be depressed to a position diagrammatically indicated at L and, from that position, may be rocked forwardly to the position V, or rearwardly to the position R in a lower plane.

When the gear shift lever assumes the position V it will, by a suitable mechanical linkage not shown in detail, rock arm 212 turning crankshaft 226 and thereby actuate detent member 82 to lock the outgoing shaft 48 of the transmission. This is the parking condition. When the lever is set to the position L, the transmission is in neutral. When the gear shift lever is moved to the R position, it will be operative to rock lever 212 in the opposite direction shifting the clutch member 222 mounted on the auxiliary shaft 219 into engagement with gear 221 and will thus shift the transmission to reverse.

When the driver wishes to start in forward direction, he must move the gear shift lever from the L position to the III position. As a result, the transmission will be automatically conditioned for starting the car in second gear and will subsequently automatically shift to third as the speed increases. When the driver wishes to continue in second, he may shift the gear shift lever to second. When he shifts the gear shift lever to the IV position, he thereby conditions the transmission for an automatic shifting into fourth gear when the car will have reached a certain speed. The gear shift lever may be also shifted to first when it is desired to drive in first gear only, as on very steep grades.

First, the various valves and symbols included in the diagrams shown in Figs. 4 to 12 will be briefly described.

P1 denotes the primary pump 89 driven by the engine.

P2 denotes the secondary pump geared to the outgoing shaft 48 of the transmission and designated by 90 in Fig. 1.

D denotes a pressure controller comprising two valve members D1 and D2 accommodated within the same bore, a helical spring $fd$ being interposed therebetween to urge the two pistons apart, the piston D2 being integral with a piston D2' of smaller diameter adapted to engage a cylindrical bore 192 co-axially communicating with the bore in which the valve members D1 and D2 are movable.

K denotes a conduit communicating with the annular chamber formed by the driving member 17 and the driven member 21 of the hydrodynamic clutch.

Sch denotes a conduit leading to the lubrication points of the transmission and/or of the engine.

M denotes a torque pressure controller adapted to vary the effective pressure supplied to the pistons 56 and 57 of the second and third gear in proportion to the torque produced by the engine, such controller including a piston valve member $m1$, a diaphragm $m$ connected thereto, a chamber $m'$ confined by the diaphragm $m$ and including a helical pressure spring $fm$ tending to urge the valve member $m1$ to the left, and a conduit $m2$ communicating with the intake manifold $m3$ of the internal combustion engine at a point located between the throttle $m4$ and the intake valves.

Rh denotes a reverse valve which functions to facilitate the shifting of the transmission into reverse, the valve member being held by a spring *fr* in engagement with the rotary cam N provided with a recess *n* for a purpose to be described later.

S denotes a gear shift controller composed of three individual valve members S1, S2 and S3, the two last mentioned valve members being urged apart by an interposed helical spring *fs*.

U denotes a shifting valve comprising a valve member urged by a helical spring *fu* to the right.

Gs is a plane shifting valve which is so connected with the shifting lever as to be moved thereby from the left to the right when the shifting lever is shifted from its upper plane of movement including the positions I, II, III and IV to its lower plane of movement comprising the positions V, L, R, or vice versa.

W denotes a ratio selector comprising two slidable piston valve members W1 and W2, the member W1 being so connected by means to be described later to the gear shift lever as to be settable to any one of four different positions when the gear shift lever is set within its upper plane to a corresponding position I, II, III, or IV. The valve member W2 co-axially arranged in the same bore as the valve member W1 is urged by a spring *fw* towards the position shown in Fig. 4 in which the valve member W2 bears against an abutment *a*. The valve member W2 may be moved from the position shown in Fig. 4 against the effect of spring *fw* by engagement of the valve member W1.

*d*1 denotes a restricted passage included in the conduit leading to piston 74 provided for the first gear condition, the restricted passage serving to throttle the flow of the pressure fluid.

*d*2 denotes a restricted passage provided in a conduit 138 that leads from the secondary pump P2 to the shifting valve U.

*d*21 denotes a restricted passage leading from the conduit 138 to discharge 0. If desired, either one of the two throttling passages *d*2 and *d*21 may be omitted.

The various conduits are indicated in Figs. 4 to 12 by lines in the following manner:

The line supplied with fluid under pressure from the primary pump P1: ─── . ─── . ─── . ─── . ───.

The line supplied with fluid under pressure by the secondary pump, P2: ─── . . ─── . . ─── . . ───.

The lines under a pressure modified by the torque pressure controller M: ─── ─── ─── ───.

The conduits relieved from pressure are full thin lines.

The lines indicating conduits under pressure are thicker than those lines indicating conduits relieved from pressure, arrows indicating the direction of flow of the fluid.

The valve housing 98 is provided with a system of discharge conduits leading to a suitable oil reservoir from which the two pumps P1 and P2 are fed. In Figs. 4 to 12 such discharge conduits are diagrammatically represented by 0.

Fig. 4 illustrates the position the various control elements will assume when the transmission is in neutral condition while the engine is running. Fluid under pressure is supplied by the primary pump P1 through a conduit 110 to the chamber 111 acting on the end face of valve member D1 of the pressure controller. The pressure of the fluid will shift the piston D1, contrary to the tendency of the spring *fd*, to the right to the position shown in Fig. 4 in which the piston uncovers a groove 112 connected with a conduit 113. This conduit supplies oil to the lubricating points of the transmission and/or of the engine. Moreover, the conduit 113 communicates with a groove 114 controlled by the valve member D2, the groove 114 being sealed thereby at this time.

A conduit 115 supplies fluid under pressure from the line 110 to three annular grooves 116, 117 and 118 provided in the wall of the bore of the pressure controller. When the piston D1 is moved to the position shown in Fig. 4, it will be operative even before uncovering the groove 112 to establish a communication between the groove 116 and an adjacent annular groove 119. The latter is connected by a line 1201 and by a line 120 with another annular groove 121 controlled by piston D2. The line 120 will supply fluid to the hydrodynamic clutch.

The conduit 110 has a branch 122 terminating in a chamber 123 which includes the spring *fu* and is confined on the right by the shifting valve member U. The liquid under pressure supplied to chamber 123 aids the spring *fu* in shifting the valve member U to the right hand end position illustrated in Fig. 4. As a result, recesses provided in the left edge of a cylindrical portion of the valve member U will uncover an annular groove 124, thus permitting the fluid under pressure to flow from the space 123 into a conduit 125 and thence to an annular groove 126 controlled by the plane shifting valve member Gs which assumes the position shown, because the gear shift lever is set to its L position in Fig. 3. The groove 126 is sealed at this time. A branch 127, however, of line 125 has a branch 128 leading to an annular groove 129 controlled by the shifting valve U. The conduit 127 is continued by a conduit 130 leading to an annular groove 131 controlled by the reverse valve member R*h*. In the position shown in Fig. 4, the groove 131 is sealed also. Therefore, the oil supplied by pump P1 to space 123 will find no outlet.

It will now be assumed that the vehicle will start moving, thus causing the secondary pump P2 geared to the outgoing shaft 48 to feed the operating fluid, e. g. oil, into conduit 132. Such fluid under pressure will be supplied through a branch 133 to the chamber 134 confined by the right hand end face of valve member D2. Line 135 leads the pressure oil from line 132 via branch 136 into a chamber 137 confined by the right hand end face of the shifting valve U. Another branch 138 in which the restricted passage *d*2 is included terminates in an annular groove 139 which at this time communicates with an adjacent groove 140 connected at 0 with the discharge. Therefore, fluid supplied by the pump P2 will be fed via the elements 132, 135, 138, *d*2, 139 and 140 and will be discharged into the oil reservoir of the pumps.

When the vehicle is speeded up increasing the pressure produced by pump P2 accordingly, such pressure will depend on the effect of the throttles *d*2 and *d*21.

Preferably, the restricted throttling passages *d*2 and *d*21 are made adjustable in a manner well known in the art.

When the outgoing shaft 48 attains a predetermined speed, the pressure existing in space 137 will surpass the pressure produced by the primary pump P1 in the chamber 123 and by the spring *fu*. When that happens the shifting valve U will be moved to its uttermost left position illustrated in Fig. 5. In this position the chamber 123 connected to the primary pump P1 will be cut off from the groove 124, while at the same time the chamber 137 will be permitted to communicate with a groove 129. As a result, the system of conduits comprising the lines 125, 126, 127, 128 and 130 will be supplied with oil under pressure by the secondary pump P2 in lieu of the primary pump P1. This shifting operation will take place whenever the speed of the outgoing shaft of the transmission surpasses a predetermined limit causing the pressure produced by the secondary pump to exceed the pressure produced by the primary pump, as may be expressed by the symbol P2>P1, irrespective of the setting of the transmission.

By displacement of the shifting valve U from the position of Fig. 4 into the position shown in Fig. 5, the communication between the grooves 139 and 140 has been interrupted and the connection of line 138 with the discharge 0 has been cut off. As a result, a higher pressure will develop in line 138 in front of the throttling restrictions *d*2 and *d*21 and in the chamber 137. The pressure increase has the effect that the return motion of the shifting valve U from the Fig. 5 position to the Fig. 4 position coincidental to any substantial decrease of the speed of the outgoing shaft 48 (P1>P2), will occur at a lower speed limit than the preceding operation in which the valve was moved from the position of Fig. 4 to the position of Fig. 5. This is an important feature of the embodiment of my invention illustrated in Figs. 4 to 12. The shifting operation in the two directions taking place at different speed limits has the peculiar effect of preventing a continual to and fro shifting between the primary pump and the secondary pump when the transmission operates at a speed close to the critical shifting speed. The throttling restriction $d21$ will ensure that the pressure produced by the secondary pump is substantially proportional to the square of the vehicle speed.

About the same time, when the shifting valve U is shifted, the pressure controller D will be shifted, too. Fluid under pressure admitted to the chamber 134 via the conduit 133 tends to move the valve member D2 to the left, contrary to the fluid pressure produced by the primary pump P1 prevailing in the chamber 111 and transferred by the spring $fd$ to the valve member D2. As soon as the pressure of the secondary pump outweighs the pressure of the primary pump (P2>P1), the valve member D2 will move to the left establishing communication between the grooves 121 and 117 and communication between the grooves 118 and 114. As a result, additional ports will be uncovered to supply oil from the primary pump P1 to the conduit K leading to the hydrodynamic clutch and to the conduit S$ch$ leading to the lubricating points. The uncovering of such additional ports causes the pressure produced by the pump P1 to suddenly collapse, whereby the valve member D1 will be likewise moved to the left bringing the pressure controller D into the condition illustrated in Fig. 6.

In this condition the secondary pump only will supply the fluid under pressure required for the actuation of the friction clutch pistons 74, 56, 57 and 30 and for the actuation of the various valves, while the primary pump will supply the oil for the hydrodynamic clutch and for the lubrication. As long as the transmission is set to neutral, the gear shift lever being in the position L in Fig. 3 holding the plane shifting valve G$s$ in its right hand end position shown in Fig. 4, both the ratio selector W and the gear shift controller S are entirely inactive since no fluid under pressure will be supplied to either.

When the driver wishes to drive the car in forward direction, he will shift the gear shift lever from the lower plane to the upper plane by raising it from the L position to the III position of Fig. 3. By suitable means which are well known in the art and do not form part of the present invention, the gear shift lever is so connected with the plane shifting valve G$s$ as to move the same to its left end position in such operation shown in Fig. 7. As a result, the control functions described hereinafter will cause the transmission to be shifted to second gear for the purpose of starting the vehicle and, when a certain speed is reached, will be automatically shifted to third gear.

When the driver leaves the gear shift lever in the III position after having shifted it to the upper plane, the ratio selector W will remain in the position illustrated in Fig. 4. As long as P1>P2, the valves will assume the position illustrated in Fig. 9. When the condition P2>P1 will have been reached, the valves will be moved into the position shown in Fig. 10.

For the purpose of explanation it will be assumed, however, that the driver will shift the gear shift lever to the I position as he will do for instance, when he must drive uphill. By so doing, the driver will move the ratio selector W into the position shown in Fig. 7 in which the valve member W1 assumes its uttermost left position.

With the parts assuming the position of Fig. 7 (first gear and P1>P2), the following operations will take place:

The fluid under pressure admitted into the groove 126 of the plane shifting valve G$s$ from the primary pump P1 via 122, 123, 124 and 125 will flow through the groove 141 and a conduit 142 to a conduit 143 and into a groove 144 of the torque pressure controller M. Another conduit 145 leads from the conduit 142 via the throttling restriction $d1$ to the first gear clutch piston 74, whereas a branch 146 leads from line 145 to a groove 147 controlled by the valve member W2 of the ratio selector. Branches 148 and 149 of conduit 142 admit the fluid under pressure to the grooves 150 and 151 controlled by the gear shift controller S. In the condition illustrated in Fig. 7 the two grooves are sealed by the valve members S1 and S3.

The torque pressure controller M functions as follows:

When the throttle $m4$ shown in Fig. 4 is more or less closed and the engine is throttled, a vacuum will exist in the manifold $m3$ which is communicated through the conduit $m2$ to the chamber $m'$ causing the diaphragm $m$ to counteract the force produced by the spring $fm$. As a result, the diaphragm will be moved to the position shown in which the right hand edge of the groove 144 co-operates with the valve member $m1$ urged to the right by a weak spring $fm'$ to throttle the communication of the conduit 143 with a groove 152 and with conduits 153 and 155 connected therewith. Consequently, the pressure of the fluid supplied to the conduits 153 and 155 from the conduit 143 will be considerably reduced. A movement of valve $m1$ to the right beyond the position shown would seal groove 144 and establish a communication between groove 152 and a groove 100 connected to discharge, thereby reducing the pressure existing in lines 153 and 155 to zero. When the engine runs at full power, no considerable vacuum will exist in the intake manifold $m3$ and in the chamber $m'$ connected thereto by the line $m2$. Consequently, the spring $fm$ will move the valve member $m1$ to the left increasing the cross section of the communication between the groove 144 and the groove 152, whereby the pressure existing in lines 153 and 155 will be increased. Hence, it is the function of the torque pressure controller to control the pressure existing in lines 153 and 155 substantially in proportion to the driving torque produced by the engine.

The line 153 leads to a groove 154 controlled by the valve member W1 of the ratio selector W. The line 155 leads to the pressure controller D and, more particularly, to a groove 156 communicating with the space between the two valve members D1 and D2 accommodating the spring $fd$. When the engine is unthrottled to a certain degree, the increased pressure existing in the groove 156 compels the pumps P1 and P2 to produce a higher pressure sufficient to overcome the forces tending to urge the valve members D1 and D2 apart. In this manner, the torque pressure controller M co-operates with the pressure controller D to increase the pressure produced by the pumps P1 and P2, as the torque produced by the engine increases.

When the elements assume the position shown in Fig. 7, the conduits 164, 175, 185 leading to the clutch actuating pistons 56, 57 and 30 for the second, third and fourth gear conditions are relieved from pressure, while the conduit 145 leading to the clutch 74 adapted to shift the transmission to first gear, is supplied with fluid under pressure. Therefore, clutch 74 will be engaged.

When the secondary pump pressure surpasses the primary pump pressure, the shifting valve U will be shifted and the pressure controller D will be moved to the position shown in Fig. 6. This does not affect the gear shifting operation, however.

When the driver moves the gear shift lever to the II position of Fig. 3, the connection thereof with the ratio selector will move valve member W1 to the Fig. 8 position. As a result, the grooves 154 and 157 will be put in communication. The pressure fluid supplied by conduit 153 to groove 154 will be admitted through conduit 158 to chamber 159 of the gear shift controller and will move the valve members S1 and S2 thereof, contrary to the force of spring $fs$, into the position illustrated in Fig. 9. This actuation of the gear shift controller will establish a communication between the grooves 150 and 160. The fluid under pressure supplied by the pump P1 or the pump P2 via the shifting valve U and the plane shifting valve Gs will be admitted from groove 160 through a conduit 161 to a groove 162 controlled by the reverse valve. From the groove 162 the oil will flow to the groove 163 and thence through a conduit 164 to the piston 56 of the second gear friction clutch. At the same time, the fluid under pressure will be admitted from groove 163 through conduits 188, 189 and 191 to the chamber 190 of the reverse valve and to the chamber 192 of the pressure controller. As a result, the limit of the pressure produced by the secondary pump, at which the latter will be connected to the system, will be reduced so that the secondary pump will become effective at a lower speed of the vehicle.

Now, both pistons 74 and 56 of the friction clutches for first gear and for second gear will be actuated. The free-wheeling clutch will permit the outgoing shaft 48 to be driven at a higher speed, as described hereinabove.

When the driver shifts the gear shift lever to the position III, the latter will move valve member W1 of the ratio selector to the position shown in Figs. 9 and 10. Depending on the speed of the outgoing shaft 48 of the transmission the condition illustrated in Fig. 10 or that illustrated in Fig. 9 will result.

It will be noted that the condition shown in Fig. 9 differs from that shown in Fig. 4 by the position of the plane shifting valve Gs which in Fig. 9 is in its left end position establishing a communication between the two grooves 126 and 141. Therefore, oil under pressure will flow via conduit 153, groove 154, groove 157 and conduit 158 into the chamber 159 of the gear shift controller moving the valve members S1 and S2, contrary to the force of the spring fs, to the right. As a result, the pressure oil supplied through the conduit 125, groove 126, groove 141, conduit 142, conduit 148 and groove 150 may enter groove 160 and flow thence via conduit 161, groove 162, groove 163 and conduit 164 to piston 56 of the second gear friction clutch keeping the transmission in second gear or, when the gear shift lever had been brought to position III from the neutral position L, shifting the transmission into second. At the same time, pressure fluid is supplied to piston 74 of the first gear. In this operation it is the function of the throttling restriction d1 to make certain that when the driver starts the vehicle shifting the gear shift lever from L to III, the toothed clutch of first gear 79, 80 will not engage until the second gear clutch actuated by piston 56 has been slightly engaged so as to more or less synchronize the toothed members 69 and 74 of the first gear clutch. In this manner, any shock coincidental to the engagement of the clutch teeth will be minimized.

In Fig. 9 the parts are shown in the position they assume when the pressure of the primary pump P1 outweighs that of the secondary pump P2 as it is true when the vehicle is just started. As soon, however, as it gathers speed, the shifting valve U will be moved to the left and will cause the pressure oil controlled by the torque pressure controller and admitted through conduit 153 to the groove 154 of the ratio selector W to flow via groove 165 and conduit 166 to the groove 167 of the shifting valve which at this time communicates with the groove 168, whence the oil flows through conduit 169 to the chamber 170 acting on the right hand end face of valve member S3 of the gear shift controller. As a result, valve member S3 will be shifted to the left, contrary to the force of spring fs. Temporarily, the valve members S1 and S2 will stay in their right hand position shown in Fig. 9, because the chamber 159 is still under the same pressure as the chamber 170.

The displacement of valve member S3 to the left permits the pressure fluid supplied by pump P2 to flow via conduit 125, groove 126, groove 141, conduit 142, branch conduit 149, groove 151, groove 171, conduit 172, groove 173 of the reverse valve Rh, groove 174 of the same valve housing, and conduit 175 to piston 57 of the third gear, whereby the latter will be engaged. As long as valve member S1 remains in its right hand position, the fluid under pressure is at the same time admitted to piston 56 of the second gear friction clutch via conduit 142, branch conduit 148, groove 150, groove 160, conduit 161, groove 162, groove 163, and conduit 164. This condition, however, in which both pistons 56 and 57 are actuated simultaneously, is but transitional and will last only for a very short period of time, because the conduit 176 communicating with the conduit 172 will supply fluid under pressure to the groove 177 of the gear shift controller at the same time when fluid under pressure is supplied to piston 57. Therefore, the pressure prevailing in the chamber 159 will be compensated for and will permit the previously biassed spring fs to move valve member S2 to the left end position separating the grooves 150 and 160 from one another and connecting groove 160 to discharge. This will de-energize piston 56 and cause disengagement of the second gear friction clutch. The elements are now in the position illustrated in Fig. 10.

The transitional coincidence of the engagement of the friction gear clutches of the second and third gear controlled by pistons 56 and 57 will prevent the engine from racing during the shifting operation.

Should the driver slow down the vehicle below a certain speed limit, the shifting valve U is restored to the position shown in Fig. 9. At the same time, the gear shift controller S is brought to the position shown in Fig. 9, whereby the transmission will be automatically shifted to second gear.

When the gear shift lever is moved by the driver to the position IV, it will move valve member W1 of the ratio selector W to the position shown in Fig. 11 in which valve member W1 engages valve member W2 and disengages the same from the abutment a contrary to the force of the spring fw, whereby the groove 154 of the ratio selector will be connected with the groove 178, and the groove 147 will be connected with the groove 179.

Provided that the secondary oil pressure exceeds the primary pressure and that accordingly the other elements assume the position shown in Fig. 10, the oil under pressure admitted from groove 178 via conduit 180 to groove 181 will be prevented by the shifting valve U from becoming operative. The oil, however, supplied by pump P2 via the conduits 135, 136, 128, 127, 125, 142, 145, 146 and grooves 147 and 149 will be admitted via line 182, groove 183, groove 184 and line 185 to the fourth gear friction clutch operable by piston 30, whereby the transmission will be shifted to fourth gear disabling the hydrodynamic clutch. Here again a transitional coincidence of the engagement of the clutches actuated by pistons 57 and 30 will prevent the engine from racing. This is achieved by the admission of fluid under pressure via a conduit 186 which may include an adjustable throttle to the space accommodating the spring fs, whereby the pressure prevailing in chamber 170 will be balanced permitting spring fs to move the valve member S3 to the right. As a result, grooves 151 and 171 will be separated and the piston 57 of the third gear friction clutch will be relieved.

Should the driver slow down the vehicle until the secondary fluid pressure drops below the primary fluid pressure, the shifting valve U will be restored from the position of Fig. 10 to the position of Fig. 9. The fluid under pressure admitted through conduit 182 to the groove 183 will be prevented by the shifting valve U from becoming operative, while at the same time the conduit 185 leading to the direct gear piston 30 will be connected with discharge via the grooves 184 and 140 of the shifting valve housing. The same applies to the groove 187 of the gear shift controller which is connected with discharge via the conduit 186 and the groove 184. Therefore, the pressure prevailing in the chamber 170 of the gear shift controller will move valve member S3 inwardly, whereby the condition illustrated in Fig. 10 will be restored thus energizing the third gear clutch shortly after disengagement of the fourth gear clutch. The pressure prevailing in chamber 170 is maintained through connection of conduit 169 with the pressure fluid line via groove 178 of the ratio selector, conduit 180 and grooves 181 and 168 of the plane shifting valve, while previously conduit 169 was supplied with fluid under pressure via groove 165 of the ratio selector, conduit 166 and grooves 167 and 168 of the shifting valve housing. In this manner the transmission is automatically shifted to third gear so that the hydrodynamic clutch is in operation preventing the engine from being stalled when the speed of the vehicle is reduced excessively.

When groove 187 of gear shift controller S is relieved from pressure, the valve members S1, S2 may move towards one another. Such movement, however, would, if permitted to be completed, restore the second gear condition shown in Fig. 7 and, therefore, must be prevented by admission of pressure fluid to groove 177 via groove 171 and conduit 176. To this end, suitable throttling restrictions may be provided or the releasing spring of the second gear clutch must be made stronger. The valve elements S1 and S2 of the gear shift controller will be re-set by the fluid pressure supplied to the third gear shift piston 57.

When the ratio selector W is restored by suitable operation of the gear shift lever from the fourth gear position to the third gear position of Fig. 10, the line 185 leading to piston 30 will be gradually relieved from pressure, as the pressure prevailing in the groove 187 decreases, and the valve member S3 of the gear shift controller will not be moved to the left shifting the transmission to third gear until the pressure in the space 187 will have dropped below the limit prevailing in chamber 170 connected by conduits 169, 166 and 153 to the torque pressure controller. Preferably, the arrangement is such that when the third gear friction clutch is engaged, the motor will have been so accelerated as to minimize any shock coincidental to the shifting from the fourth gear to third gear.

When the driver wishes to shift the transmission to reverse, he will move the gear shift lever to the R position. By a suitable connection with the gear shift lever, the rotary cam N having a peripheral recess *n* will be turned in the direction of the arrow so as to permit a stem *r* of the valve member of the reverse valve to temporarily engage the recess *n* under the effect of the spring *fr*. This has the effect of simultaneously engaging both of the friction clutches of the second gear and of the third gear, thereby blocking and stopping the gears to facilitate subsequent engagement of the reversing gear. When the valve member is shifted to the right, the conduit 164 will be separated from the conduit 161 and will be connected with the conduit 130. Similarly, the conduit 175 will be separated from the conduit 172 and will be connected with the conduit 130 which is supplied with oil under pressure either via the elements 123, 124 and 127 from the primary pump P1 or via the elements 136, 129, 128 from the secondary pump P2.

In the event the driver should turn cam N so slowly that this condition should tend to last for a longer period of time than desirable, the pressure prevailing in chamber 190 of the reverse valve will restore the reverse valve member Rh to the left as soon as the pressure in the lines 164 and 165 will have reached a certain limit. Therefore, the vehicle cannot be suddenly blocked.

When the driver moves the gear shift lever into the position V in Fig. 3, the detent member 82 will be actuated by the crankshaft 226 (Fig. 1a).

While the function and co-operation of the various valves will be clear from the above description with reference to the diagrammatic illustrations in Figs. 4 to 12, the exact construction of such valves in the present embodiment of my invention is shown in Figs. 13 to 18. As stated above, the valve housing 64 is mounted on the inside of a cover plate 97 which seals an opening in a side wall of the transmission casing, and on its inner face is provided with grooves, such as 201, constituting the conduits communicating with bores provided in the walls of the transmission casing. The grooves 201 are closed by a sheet metal plate 200 interposed between the transmission casing and the cover plate 97. The sheet metal plate 200 is provided with openings, such as 202, as are required to provide for a proper communication between the conduits in the valve housing 64 and the recesses 201.

The valve housing 64 has four parallel bores in which the valve members are mounted.

The valve element W1 extends out of the housing 98 and its end is provided with a peripheral groove 203 engaged by a pin on the end of an arm 204, Figs. 15 and 16, attached to the inner end of a shaft 205 journalled in a bushing 215. The outer end of shaft 205 is attached to an auxiliary gear shift lever 206 which is so connected with the main gear shift lever as to be rocked when the latter is rocked forwardly or rearwardly from the positions L and III. The shaft 205 and the hollow bushing 215 can be connected for common rotation by a ball 216 acting like a key.

The plane shifting valve Gs has a stem extending out of the housing 98 and having a head 208 provided with a peripheral groove 207. A crank pin 209 of a crankshaft 210 journalled in the cover plate 97 extends into the groove 207 of head 208. The outer end of the crankshaft 210 is connected to an arm 211 which is so connected with the gear shift lever as to be rocked when the latter is moved from L to III, or vice versa.

An arm 212 fixed to the bushing 215 between the cover plate 97 and the lever 204 serves the purpose of shifting the reversing gear and of operating the detent lever 82.

When the gear shift lever is set to its lower plane, the ball 216 is moved to the locking position shown by a slidable member 217 mounted in a bore of the cover plate 97. A ball 218 is interposed between the slidable member 217 and the periphery of the crankshaft 210. When the parts assume the position shown in Fig. 16, arm 206 is thus connected for common rocking motion with both the arm 204 and the arm 212. When the gear shift lever, however, is moved to its upper plane, a recess provided in the periphery of the crankshaft 210 will register with the ball 218 permitting the slide 217 and the ball 216 to move upwardly to thereby disengage the bushing 215 and the arm 212 from the shaft 205 and the arms 206 and 204 attached thereto. Therefore, arm 212 may remain at rest when the gear shift lever is rocked within its upper plane. Means are provided to lock arm 212 under such conditions, such means comprising a ball 213 mounted in an opening of sheet metal plate 200 and adapted to engage either a recess 214 provided in the arm of crank 209 or a recess provided in lever 212. When the crankshaft 210 is turned by motion of the gear shift lever to its upper plane, ball 213 is urged out of the recess 214 and will then lock arm 212.

Briefly reiterating the function it will be appreciated from the above description that when the transmission is shifted to one of the upper gears, more particularly to the direct gear, it will be automatically shifted to the next lower gear when the speed of the vehicle drops below a certain limit, and that when the vehicle speed increases again, the transmission will be shifted back to the higher gear. Such automatic shifting operation takes place between second gear and third gear, and between third gear and fourth gear in the embodiment shown.

The gear shifting operations are performed by engagement and disengagement of the friction clutches in such a manner that when the transmission is shifted from a lower gear to a higher gear, the periods of engagement of the friction clutches will overlap. In other words, the friction clutch of the higher gear will be engaged just before the friction clutch of the lower gear will be disengaged. This serves the purpose of securing a smooth transition from one gear to another and of preventing the motor from racing.

Vice versa, when the transmission is shifted from a higher gear to a lower gear, both clutches are temporarily disengaged at the same time in order to permit the engine to increase its speed. In this manner, shocks incidental to the gear shifting operation will be minimized. It will be also noted that the period of time allowed the engine to accelerate depends on the position of the throttle $m4$.

The provision of the two pumps P1 and P2 will ensure the availability of fluid under pressure when the engine is stalled while the vehicle is still running, or when the engine is idling and the vehicle is at rest. The control system will be connected by the valve U to that pump at any time which produces the higher pressure. When the speed of the vehicle drops, the transmission will be automatically shifted to a lower gear capable of producing a more powerful driving torque. As the power is transferred by a hydrodynamic clutch with any gear shifting condition other than direct gear, the engine will not be stalled by slowing down the vehicle too much. Therefore, the driver may stop the vehicle without operating a clutch or a gear shift lever.

Moreover, it will be noted that the automatic gear shifting operation is performed coincidentally with the pump shifting operation under control by the same valve U which, in its turn, controls the valve member S3 causing engagement of the third gear clutch and disengagement of the second gear clutch. As a result, the vehicle will start in second gear (unless the gear shift lever is set to first gear) and as soon as the vehicle has gathered sufficient speed, the transmission will be automatically shifted to third gear. Owing to the connection of line 138 with discharge through the throttling restriction $d2$, the speed limit at which the shifting operation takes place is made dependent on the speed, since the oil pressure produced by the secondary pump will be proportional to the square of the vehicle speed. This connection will be cut off by the valve U when the secondary pump is made effective. As a result, the transmission will be shifted back from third gear to second gear at a higher speed of the vehicle.

The operations of shifting the transmission from the second gear to the third and from the third gear to second take place at a lower speed than the operation of shifting the transmission from third to fourth gear and vice versa.

The acceleration or deceleration of the engine and of the vehicle in gear shifting operations will be smooth and free from shocks, as the torque variations resulting from the acceleration and deceleration of the inertia of the rotary masses to be clutched to each other does not exceed the limit of about 1–2 mkg. On the other hand, the fluid pressure acting on the multi-disk friction clutches is so controlled by the torque pressure controller as to be amply sufficient to transfer the driving torque at any time from the driving shaft to the driven shaft of the transmission. This torque, however, varies depending on the position of the engine control member, such as the throttle valve $m4$. The clutch-engaging pressure produced by the fluid under pressure is so controlled by the torque pressure controller as to depend on the driving torque produced by the engine. This is attained by causing the vacuum existing in the intake manifold $m3$ to act on the diaphragm $m$ contrary to the force of the spring $fm$, the diaphragm, in its turn, determining the pressure set up in the groove 152. The intake vacuum is particularly well adapted for such control, because within normal conditions of operation it is nearly inversely proportional to the engine torque. The valve member $m1$ movable by the diaphragm will reduce the fluid pressure produced by one of the pumps P1, P2 to vary the pressure, as the driving torque of the engine varies. The fluid pressure so controlled will then act on the gear shifting mechanism.

The dependency of the gear shifting operation on the torque produced by the engine has the further advantage that load imposed on the pump corresponds to the required driving torque so that the power consumed by the pumps P1 and P2 which reduces the efficiency of the transmission, is low when the engine is throttled thus resulting in a high efficiency of the transmission. Moreover, it will be understood from the foregoing description that the acceleration of the engine required when the transmission is shifted from a higher to a lower gear will not be dervied from the inertia of the moving vehicle, as the latter would be slowed down thereby. The engine is accelerated by a temporary disconnection of the driving shaft and the driven shaft thus giving the engine time to speed up to the required number of revolutions under its own power. As the engine will slowly pick up speed when the throttle $m4$ is more or less closed, it will be permitted more time owing to the reduction of the fluid pressure after disengagement of one multi-friction clutch and prior to the engagement of the other multi-friction clutch. This is another material advantage obtained by the torque pressure controller and by the use of the fluid so controlled for the actuation of the gear shifting mechanism. When the torque produced by the engine is comparatively small, the pistons actuating the multi-friction clutches will be slower than otherwise owing to such control.

As the secondary pump will be made operative to act on the control system the sooner the smaller the momentary oil pressure is, i. e. the smaller the torque produced by the engine is, the gear shifting operation to a higher gear will occur the sooner the smaller the torque produced by the engine is. Thus, without any additional controlling mechanism, the effect is attained that such automatic gear shifting operation takes place the sooner the smaller the power is. In addition to the torque pressure controller M and the shifting valve U operable in dependence on the vehicle speed and the driving torque of the engine, the plane shifting valve $Gs$ is provided which is settable to two different positions depending on whether the gear shift lever is movable in the lower route or plane comprising "Parking," "Idle" and "Reverse" or in the upper route or plane comprising "First Gear," "Second Gear," "Third Gear" and "Fourth Gear." Finally the ratio selector comprising the manually settable valve member W1 and the automatically shiftable valve member W2 are provided to control the shifting operation.

I have found it particularly desirable that the gear shift lever, when moved from the lower plane to the upper plane, will be in the third gear position, the various valves acting in such a manner that, with this position of the gear shift lever, the transmission will be automatically shifted to second gear by the pressure fluid if the vehicle is to be started, and is then automatically shifted to third when the condition permits, that is to say when the speed and the motor driving torque have reached certain limits. It will be further noted that the first gear which is not required to brake the vehicle when it is driven downhill, is connected with the outgoing transmission shaft 48 by the free-wheeling clutch and will thus automatically become inactive when the transmission is shifted to a higher gear.

As the first gear which may be connected with the driven shaft by a free-wheeling clutch is connected with the driven shaft also by a toothed clutch, special care must be taken to provide a possibility of shifting into first gear while the vehicle is in motion without causing a shock when previously the transmission was set to a higher gear. This is the reason why the teeth of the clutch are beveled so that the engaging motion of the clutch teeth will release the free-wheeling clutch. Before the clutch teeth engage or about the same time, one of the friction clutches is engaged by fluid pressure whereby the toothed clutch elements are synchronized prior to engagement. This it attained by suitably throttling the fluid without requiring any additional control members.

Another advantage of my invention is the use of the reverse valve R*h* which serves the purpose of causing a temporary, soft engagement of the friction clutches of the second gear and of the third gear before the transmission is shifted to reverse. This will temporarily brake the transmission and the vehicle driven thereby to bring the vehicle to a full stop, irrespective of the minimum torque transferred by the hydrodynamic clutch when the engine is idling. The reverse valve R*h* is actuated by the train of elements serving to shift the reverse gear, such train including the cam N. Should the fluid pressure operating the friction clutches attain a certain limit, the pressure will be operative to restore the valve R*h* thereby preventing an excessive rise of the clutch-engaging pressure, which might otherwise block the driven wheels of the behicle when the same is still travelling. The same slide R*h* may be employed to prevent the vehicle from creeping.

The term "ram" used in the claims following hereinafter is intended to define any of the pistons 30, 56, 57 and 74 and its associated cylinder.

Having now described my invention by reference to a preferred embodiment thereof, I wish it to be clearly understood that my invention is in no way limited to the particular details of such embodiment, but is capable of numerous modifications within the scope of the appended claims.

What I claim is:

1. An automotive speed change transmission comprising a driving member, a driven shaft, means including a friction clutch adapted to establish a direct power-transmitting connection between said driving member and said driven shaft, a second shaft, disengageable means for gearing said second shaft to said driven shaft at various ratios of transmission for different forward speeds, means including a hydrodynamic clutch establishing a permanent driving connection between said driving member and said second shaft, and controlling means adapted to simultaneously engage said friction clutch and to disengage said disengageable means, said disengageable means being of a type which in engaged condition is capable of two-way torque transmission from said second shaft to said driven shaft and vice versa.

2. A speed change transmission comprising a driving member, a driven shaft, means including a friction clutch adapted to establish a direct power-transmitting connection between said driving member and said driven shaft, a second shaft, a plurality of pairs of meshing gears mounted on said second shaft and on said driven shaft, said pairs having different ratios of transmission, one gear of each pair being fixed to its shaft, a clutch co-ordinated to the other gear of each pair and its associated shaft and adapted when engaged to establish a power-transmitting connection between said second shaft and said driven shaft, means including a hydrodynamic clutch adapted to establish a driving connection between said driving member and said second shaft, and controlling means adapted to engage said friction clutch and to simultaneously disable said pairs of gears by disengagement of their associated clutches.

3. The combination claimed in claim 1, in which said disengageable means for gearing said second shaft to said driven shaft at various ratios of transmission comprises at least three pairs of gears and disengageable clutches individually co-ordinated to said pairs.

4. A speed change transmission comprising a driving member adapted to be driven by an engine, a driven shaft adapted to be geared to the wheels of the vehicle, means including a clutch adapted to establish a direct power-transmitting connection between said driving member and said driven shaft, a second shaft, a train of power-transmitting elements connecting said second shaft to said driving member and including a hydrodynamic clutch, at least two pairs of speed-reducing gears mounted on said shafts for two-way power transmission between said shafts for different forward speeds, means for individually rendering said pairs of reducing gears unable to transfer power, and controlling means adapted to engage said first mentioned clutch when all of said pairs of reducing gears are disabled to transfer power.

5. In a speed change transmission for motor vehicles, the combination comprising a driving member, a driven shaft adapted to be geared to the wheels of the vehicle, a second shaft, a plurality of pairs of reducing gears of various ratios of transmission mounted on said shafts and adapted to establish a driving connection therebetween, said pairs including one low speed pair having the highest ratio of transmission of said pairs, a hydrodynamic clutch composed of two sections, one of said clutch sections being connected to said driving member and the other one of said sections being geared to said second shaft, a free-wheeling clutch being included in the train of motion-transmitting elements constituted by said second shaft, by said low speed pair and by said driven shaft, said free-wheeling clutch being mounted to enable said driven shaft to overtake the associated gear of said low speed pair when driven by one of the other pairs of gears, and a clutch adapted to establish a direct driving connection between said driving member and said driven shaft, said pairs of reducing gears also including a second speed pair and a third speed pair, disengageable multi-disk clutches individually coordinated to said second speed pair and said third speed pair, a pump geared to said driving member, a second pump geared to said driven shaft, fluid-operable rams for actuation of said disengageable clutches, and a speed-responsive valve system connecting said pumps to said disengageable clutches for selective engagement thereof.

6. A speed change transmission comprising the combination set forth in claim 1 combined with a detent member mounted in the casing of the transmission and adapted to co-operate with said driven shaft for the purpose of blocking same, and with means for disabling and enabling said detent member to cooperate with said driven shaft.

7. A speed change transmission as claimed in claim 1, in which said driving member, said driven shaft, said friction clutch, and said hydrodynamic clutch are mounted in co-axial relationship.

8. In a speed change transmission for motor vehicles, the combination comprising a hydrodynamic clutch composed of a driving section adapted to be connected to the engine of said vehicle and of a driven section, both sections constituting an annular chamber adapted to contain a liquid and having vanes in said chamber, a hollow shaft connected to said driven section of said hydrodynamic clutch, a driven shaft adapted to be geared to the wheels of the vehicle, said shafts and said sections being mounted in co-axial relationship, a reduction gearing connecting said hollow shaft with said driven shaft, means for rendering said reduction gearing unable to connect said hollow shaft with said driven shaft, and a train of motion-transmitting elements connecting said driving section and said driven shaft and including a disengagable clutch and an inner shaft mounted within said hollow shaft, said friction clutch being mounted within said hydrodynamic clutch and in co-axial relationship thereto and to said driven shaft.

9. A speed change transmission for motor vehicles comprising two parallel shafts, a hydrodynamic clutch including a driving section and a driven section, means for connecting said driving section to the engine of the vehicle, power-transmitting means connecting said driven section of said hydrodynamic clutch to one of said shafts, the other one of said shafts being adapted to be geared to the wheels of the vehicle, at least two pairs of meshing gears mounted on said shafts for gearing same to one another, three multi-disk friction clutches, one of said clutches being adapted to render effective one of said pairs of gears to gear said shafts to one another or ineffective, the second one of said clutches being adapted to render the other one of said pairs of gears effective to gear said shafts to one another, and the third one of said clutches being adapted to directly connect said driving section to said other one of said shafts, fluid-operable pistons for actuating said friction clutches, and means for controlling the admission of fluid under pressure to said pistons for selective actuation of said clutches.

10. A speed change transmission for a motor vehicle comprising a driven shaft adapted to be geared to the wheels of the vehicle, three gears mounted co-axially thereto, means for connecting said three gears to said driven shaft, a secondary shaft, three gears mounted on said secondary shaft and meshing with said first mentioned gears, disengageable multi-disk friction clutches for connecting and disconnecting at least two of said last mentioned gears to and from said secondary shaft, a gear casing having partitions, anti-friction bearings in said partitions supporting said shafts, said gears being located between said anti-friction bearings and said multi-disk friction clutches, a driving member adapted to be connected to the engine of the vehicle, a train of motion-transmitting elements connecting said member to said secondary shaft and including a hydrodynamic clutch, a disengagable clutch adapted to connect said driving member to said driven shaft for common rotation, a pump geared to said driving member, a second pump geared to said driven shaft, fluid-operable rams for actuation of said disengageable clutches, and a speed-responsive valve system connecting said pumps to said disengageable clutches for selective engagement thereof.

11. A speed change transmission as claimed in claim 9, in which said three multi-disk friction clutches have equal dimensions being composed of interchangeable parts.

12. In a speed change transmission, the combination set forth in claim 5 in which a bearing is provided for said second shaft, one end of the latter projecting therefrom, said low speed pair including a gear mounted on said end of said second shaft.

13. In a speed change transmission for motor vehicles, the combination set forth in claim 5 comprising in addition a toothed clutch mounted on said driven shaft and adapted to connect same with said free-wheeling clutch, fluid-operable means for engaging and disengaging said toothed clutch, a reversing gear adapted to gear said driven shaft to said second shaft, means adapted to render said reversing gear effective to gear said driven shaft to said second shaft or ineffective, and control means connected to said last mentioned means and causing same to render said reversing gear ineffective when said toothed clutch is engaged by fluid pressure.

14. In a speed change transmission for motor vehicles, the combination set forth in claim 5 comprising in addition a toothed clutch having beveled teeth mounted on said driven shaft and adapted to connect same with said free-wheeling clutch, fluid-operable means for engaging and disengaging said toothed clutch, a reversing gear adapted to gear said driven shaft to said second shaft, means adapted to render said reversing gear effective to gear said driven shaft to said second shaft or ineffective, and control means connected to said last mentioned means and causing same to render said reversing gear ineffective when said toothed clutch is engaged by fluid pressure.

15. In a speed change transmission for motor vehicles, the combination comprising a driving member adapted to be connected to the engine, a driven shaft adapted to be geared to the wheels of the vehicle, a direct gear clutch adapted to connect said driving member and said driven shaft for common rotation, a speed change reduction gearing, a hydrodynamic clutch permanently connected to said driving member and adapted to transfer driving power therefrom to said reduction gearing, the latter being adapted to drive said driven shaft at any one of a plurality of ratios of transmission, fluid-operable means for shifting said direct gear clutch and said reduction gearing, conducting means for admitting a fluid under pressure to said means, a movable member indicative of the torque of said driving member, means responsive to the speed of said driven shaft and controlled by said movable member and adapted to so control said conducting means as to cause the latter to shift said reduction gearing to a lower speed when said first mentioned speed drops below a certain limit, and to a higher speed when said first mentioned speed increases above a certain limit, said limit increasing as said torque increases.

16. In a speed change transmission for motor vehicles, the combination comprising a driving member adapted to be connected to the engine, a driven shaft adapted to be geared to the wheels of the vehicle, a direct gear clutch adapted to connect said driving member to said driven shaft for common rotation, a hydrodynamic clutch connected to said driving member, a secondary shaft permanently connected to and driven by said hydrodynamic clutch, a multi-stage reduction gearing adapted to gear said driven shaft to said secondary shaft at any one of a plurality of ratios of transmission, fluid-operable rams co-ordinated to and adapted to shift said multi-stage reduction gearing for the selection of a ratio of transmission and to engage and disengage said direct gear clutch, a source of a fluid under pressure, fluid conducting means for admitting said fluid to said fluid-operable rams, a movable member indicative of the torque exerted by said driving member, means responsive to the speed of said driven shaft and controlled by said movable member and adapted to so control said fluid conducting means as to shift said multi-stage reduction gearing to a higher ratio of transmission when said speed drops below a certain limit, and to a lower ratio of transmission when said speed increases beyond a certain limit, said limit increasing as said torque increases.

17. A speed change transmission for motor vehicles comprising a driving member adapted to be connected to the engine, a driven shaft adapted to be geared to the wheels of the vehicle, a direct gear clutch adapted to connect said driving member and said driven shaft for common rotation, a hydrodynamic clutch connected to said driving member, a secondary shaft, means establishing a power-transmitting train between said secondary shaft and said hydrodynamic clutch, a first pair of gears adapted when active, and unable when inactive, to establish a driving connection between said secondary shaft and said driven shaft at a lower ratio of transmission, a disengageable friction clutch adapted to render said pair of gears active or inactive, a second pair of gears adapted when active, and unable when inactive to establish a driving connection between said secondary shaft and said driven shaft at a higher ratio of transmission, a disengageable friction clutch adapted to render said second pair of gears active or inactive, fluid-operable means adapted to actuate said clutches, a source of a fluid under pressure, conducting means for admitting said fluid to said fluid-operable means, and means responsive to the speed of said driven shaft and adapted to so control said conducting means as to cause the latter, when said first mentioned speed passes through a certain limit, to disengage one of said clutches and to engage another one of said clutches.

18. Control system for a speed change transmission for motor vehicles of the type having a first clutch adapted when actuated to shift the transmission into first gear, a second clutch adapted when actuated to shift the transmission into second gear, a third clutch adapted when actuated to shift the transmission into third gear, and a fourth clutch adapted when actuated to shift the transmission into fourth gear, said first clutch being a toothed clutch while said other clutches are friction clutches, the combination comprising fluid-operable actuators individually co-ordinated to and adapted to actuate the clutches, a source of fluid under pressure, conducting means adapted to selectively connect said source to said actuators, a movable member indicative of the torque exerted by said driving member means responsive to the speed of the vehicle and controlled by said movable member and adapted to so control said conducting means as to cause the latter to relieve the actuator of one clutch and to admit the fluid under pressure to the actuator of the next higher clutch when said speed of the driven shaft increases above a certain limit, and to, inversely, relieve said last mentioned actuator and to admit the fluid to the actuator of the clutch of said one speed when said speed of the driven shaft drops below a certain limit, said limit increasing as said torque increases.

19. Control system for a speed change transmission for motor vehicles of the type having a first clutch adapted when actuated to shift the transmission into first gear, a second clutch adapted when actuated to shift the transmission into second gear, a third clutch adapted when actuated to shift the transmission into third gear, and a fourth clutch adapted when actuated to shift the transmission into fourth gear, said first clutch being a toothed clutch while said other clutches are friction clutches, the combination comprising fluid-operable actuators individually co-ordinated to and adapted to actuate the clutches thus including a first actuator, a second actuator, a third actuator and a fourth actuator, a source of fluid under pressure, conducting means adapted to selectively connect said source to said actuators, a gear shift lever adapted to be shifted to a first gear position, to a second gear position, to a third gear position, and to a fourth gear position, said conducting means including a valve settable by said gear shift lever to anyone of four positions, and means responsive to the speed of the vehicle and adapted to so control said conducting means as to cause the latter, when said gear shift lever is in its fourth gear position, to admit the fluid under pressure to said fourth actuator of the fourth clutch or to said third actuator of the third clutch depending on said speed, and as to cause said conducting means, when said gear shift lever is in said third gear position, to admit the fluid under pressure to said third actuator of said third clutch or to said second actuator of said second clutch depending on said speed.

20. Control system in and for a motor vehicle speed change transmission including a driven shaft, a slowly revolving gear, a motion-transmitting train establishing a driving connection between said slowly revolving gear and said engine, and a free-wheeling clutch, the latter and said first clutch being interposed between such slowly revolving gear and said driven shaft, said control system comprising the combination set forth in claim 19 said conducting means being adapted in any of said four positions of the gear shift lever to admit said fluid under pressure to said first actuator of said first clutch, whereby said first clutch will be kept in engaged condition in any of the forward gear shift conditions of the transmission.

21. Control system for a speed change transmission for motor vehicles having a plurality of disengageable clutches adapted by selective engagement to set the transmission to various ratios of transmission, the combination comprising fluid-operable actuators individually co-ordinated to the clutches, a source of fluid under pressure, conducting means adapted to selectively connect said source to said actuators and including a plurality of valves, and means for setting said valves, said source including a primary pump geared to the driving transmission shaft and a secondary pump geared to the driven transmission shaft, at least one of said valves being a pump-selecting valve adapted to selectively connect said pumps to said conducting means, said last mentioned valve being movable in response to the pressure produced by said pumps.

22. In a control system, the combination set forth in claim 21 including a feed line connecting said secondary pump to said valves, a restricted communication being provided between said feed line and a discharge opening, one of said valves controlling said communication for the purpose of varying the pressure of said secondary pump.

23. In a control system, the combination claimed in claim 21 including a movable member indicative of the torque acting on the driving transmission shaft, a pressure reducing mechanism connected to said source of fluid under pressure, and a co-operative connection between said movable member and said reducing mechanism causing the latter to vary said pressure in the same sense as said torque varies.

24. The combination claimed in claim 21 in which said pump-selecting valve includes two cylindrical co-axial valve members, a spring therebetween, said conducting means admitting pressure fluid from said primary pump to the outer end face of one of said members, and admitting pressure fluid from said secondary pump to the outer end face of the other one of said members and admitting fluid under pressure to the space between said valve members, and a torque pressure controller adapted to vary the pressure of the fluid admitted to said space in dependence on the torque acting on the driving transmission shaft.

25. Control system for a speed change transmission for motor vehicles having a plurality of disengagable clutches adapted by selective engagement to set the transmission to various ratios of transmission, comprising fluid-operable actuators individually co-ordinated to the clutches, a source of fluid under pressure, conducting means adapted to selectively connect said source to said actuators and including a plane shifting valve movable by a gear shift lever to one of two positions depending on whether the gear shift lever is set for rocking motion in an upper plane or set for rocking motion in a lower plane, a ratio selector valve settable by the gear shift lever to anyone of a plurality of positions, and a gear shift controller composed of a plurality of co-axial valve members movable by the pressure of fluid admitted under control of said plane shifting valve and said ratio selector valve.

26. In a speed change transmission for motor vehicles having a plurality of disengagable clutches adapted by selective engagement to set the transmission to various ratios of transmission, the control system comprising fluid-operable actuators individually co-ordinated to the clutches, a source of fluid under pressure, conducting means adapted to selectively connect said source to said actuators and including a plane shifting valve movable by a gear shift lever to one of two positions depending on whether the gear shift lever is set for rocking motion in an upper plane or set for rocking motion in a lower plane, a ratio selector valve settable by the gear shift lever to any one of a plurality of positions, and a gear shift controller composed of a plurality of co-axial valve members movable by the pressure of fluid admitted under control of said plane shifting valve and said ratio selector valve, said valves being so correlated to each other and to said actuators that said plane shifting valve, when being set to one of its two positions, co-operates with said gear shift controller to supply fluid under pressure to the actuator of the highest ratio of transmission, and that the actuators for the other ratios of transmission are seleced for actuation by subsequent setting of the ratio selector valve.

27. In a speed change transmission for motor vehicles, the combination comprising a driving member, a driven shaft, a gear geared to said driving member to revolve at a relatively low speed, a second gear geared to said driving member to revolve at a relatively high speed, a free-wheeling clutch and a toothed clutch between said last mentioned gear and said driven shaft, a friction clutch between said secondly mentioned gear and said driven shaft, fluid-operable actuators individually co-ordinated to said toothed clutch and to said friction clutch for engagement of same, a source of a fluid under pressure, conduits to connect said source to said actuators for the purpose of engaging said toothed clutch and said friction clutch, and a throttle inserted in said conduit leading to said toothed clutch, whereby engagement of the toothed clutch will be delayed until after said friction clutch will have been engaged.

28. The combination set forth in claim 18 in which said means responsive to the speed of the vehicle include a valve, and in which said source of fluid under pressure includes a pump geared to the driven transmission shaft to produce pressure depending upon the speed of the vehicle, said valve being arranged to be movable by said pressure and adapted to influence said conducting means causing the latter to relieve the actuator of one clutch and to admit the fluid under pressure to the actuator of the next higher clutch when the speed of the driven shaft increases above said certain limit.

29. Control system for a speed change transmission for motor vehicles having a plurality of clutches adapted when selectively actuated to set the transmission to various ratios of transmission, said system comprising fluid operable actuators individually co-ordinated to and adapted to actuate the clutches, a source of fluid under pressure including a primary pump geared to the driving transmission shaft and a secondary pump geared to the driven transmission shaft, conducting means adapted to selectively connect said source to said actuators, said conducting means including a shifting valve movable to one or the other of two positions by fluid pressure and arranged to be subjected to the opposed pressures produced by said pumps, said conducting means further including a conduit leading from one of said pumps to said shifting valve, a discharge port, said valve being adapted in one position to connect said conduit to said discharge port to thereby reduce the pressure produced by said last mentioned pump and, in its other position, to disrupt the connection of the discharge port with said conduit to thereby increase the pressure produced by said last mentioned pump.

30. The combination claimed in claim 29 in which the communication between said discharge port and said last mentioned pump including said conduit and said valve is provided with a throttle.

31. The combination set forth in claim 25 in which said gear shift controller is adapted to control the connection of said source to those of said actuators as are allotted to at least two medium ratios of transmission, and in which said valve members constituting said gear shift controller co-operate with an interposed spring being so co-ordinated to said other valves that when admitting fluid pressure to one of said actuators, only one of said co-axial valve members is subjected to pressure from said source to be displaced contrary to the force of said spring, while another one of said co-axial valve members is relieved from fluid pressure, and that when said ratio selector valve is set to admit fluid under pressure to those of said actuators co-ordinated to two next higher ratios of transmission, said one of said co-axial valve members is relieved from fluid pressure, whereas said other one of said co-axial valve members is subjected to said fluid pressure.

32. In a speed change transmission for motor vehicles equipped with the system set forth in claim 25 including a reversing gear, a settable member adapted to disable or enable said reversing gear, locking means mounted on the casing of said transmission and adapted to lock said settable member in disabling position, and means connecting said plane shifting valve to said locking means to render the latter effective to lock the reversing gear in disabled position when said plane shifting valve is in that one of its two positions that is correlated to the upper plane of said rocking motion.

33. In a speed change transmission for motor vehicles equipped with the system set forth in claim 25 including a reversing gear, a settable member adapted to disable and enable said reversing gear, a reverse valve included in said conducting means, means connected to said settable member and adapted, during the setting motion thereof, to temporarily shift said reverse valve, the latter being adapted when so shifted to admit fluid under pressure from said source to two of the clutches to thereby temporarily lock said transmission for arresting the gears thereof prior to enabling said reversing gear, and a rotary member connected to said plane shifting valve for common motion and adapted to lock said settable member when said plane shifting valve is in its upper plane position in which it renders said gear shift controller and said ratio selector operative to admit fluid under pressure to any one of said actuators.

34. In a speed change transmission for motor vehicles equipped with the system set forth in claim 25 including a reversing gear, a settable member adapted to disable and enable said reversing gear, a reverse valve included in said conducting means, means connected to said settable member and adapted, during the setting motion thereof, to temporarily shift said reverse valve, the latter being adapted when so shifted to admit fluid under pressure from said source to two of the clutches to thereby temporarily lock said transmission for arresting the gears thereof prior to enabling said reversing gear, and a rotary member connected to said plane shifting valve for common motion and adapted to lock said settable member when said plane shifting valve is in its upper plane position in which it renders said gear shift controller and said ratio selector operative to admit fluid under pressure to any one of said actuators, said reverse valve being arranged to be subjected to a restoring effect by the pressure of the fluid admitted by said reverse valve to said two of said actuators.

35. In a speed change transmission for motor vehicles, the combination comprising a driving member adapted to be connected to the engine, a driven shaft adapted to be geared to the wheels of the vehicle, a direct gear clutch adapted to connect said driving member to said driven shaft for common rotation, a hydrodynamic clutch connected to said driving member, a secondary shaft permanently connected to and driven by said hydrodynamic clutch, a multi-stage reduction gearing adapted to gear said driven shaft to said secondary shaft at any one of a plurality of ratios of transmission, fluid-operable rams coordinated to and adapted to shift said multi-stage reduction gearing for the selection of a ratio of transmission and to engage and disengage said direct gear clutch, a source of a fluid under pressure, fluid conducting means for admitting said fluid to said fluid-operable rams, a movable member indicative of the torque exerted by said driving member, means responsive to the speed of said driven shaft and controlled by said movable member and adapted to so control said fluid conducting means as to shift said multi-stage reduction gearing to a higher ratio of transmission when said speed drops below a certain limit, and to a lower ratio of transmission when said speed increases beyond a certain limit, said limit increasing as said torque increases, said means responsive to the speed of said driven shaft including a valve adapted to be shiftable by the fluid substantially simultaneously with said multi-stage reduction gearing and adapted to vary said limit, whereby said transmission will be shifted from one gear to a higher gear at one speed limit and back from the higher gear to the lower gear at another speed limit.

36. Control system for a speed change transmission for motor vehicles having a plurality of disengageable clutches adapted by selective engagement to set the transmission to various ratios of transmission, the combination comprising fluid-operable actuators individually coordinated to the clutches, a source of fluid under pressure, conducting means adapted to selectively connect said source to said actuators and including a plurality of valves, means for setting said valves, said source including a primary pump geared to the driving transmission shaft and a secondary pump geared to the driven transmission shaft, at least one of said values being a pump-selecting valve adapted to selectively connect said pumps to said conducting means, a movable member indicative of the torque acting on the driving transmission shaft, a pressure-reducing mechanism connected to said source of fluid under pressure, and a cooperative connection between said movable member and said reducing mechanism causing the latter to vary said pressure in the same sense as said torque varies, said pump-selecting valve being movable by the pressure produced by said primary pump and by the opposed pressure which is produced by the secondary pump and is modified by said pressure-reducing mechanism.

37. In a speed change transmission for motor vehicles, the combination comprising a driving member adapted to be connected to the engine, a driven shaft adapted to be geared to the wheels of the vehicle, a direct gear clutch adapted to connect said driving member to said driven shaft for common rotation, a hydrodynamic clutch connected to said driving member, a secondary shaft permanently connected to and driven by said hydrodynamic clutch, a multi-stage reduction gearing adapted to gear said driven shaft to said secondary shaft at any one of a plurality of ratios of transmission, fluid-operable rams coordinated to and adapted to shift said multi-stage reduction gearing for the selection of a ratio of transmission and to engage and disengage said direct gear clutch, a source of a fluid under pressure, fluid-conducting means for admitting said fluid to said fluid-operable rams, a movable member indicative of the torque exerted by said driving member, means responsive to the speed of said driven shaft and controlled by said movable member and adapted to so control said fluid-conducting means as to shift said multi-stage reduction gearing to a higher ratio of transmission when said speed drops below a certain limit, and to a lower ratio of transmission when said speed increases beyond a certain limit, said limit increasing as said torque increases, and a torque pressure controller adapted to control the pressure of said fluid admitted to said rams, said controller consisting of a diaphragm chamber, a diaphragm therein, a conduit extending between said chamber and the intake manifold of the engine driving the transmission, and a reduction valve movable by said diaphragm.

38. Control system for a speed change transmission for motor vehicles having a plurality of disengageable clutches adapted by selective engagement to set the transmission to various rations of transmission, the combination comprising fluid-operable actuators individually coordinated to the clutches, a source of fluid under pressure, conducting means adapted to selectively connect said source to said actuators and including a plurality of valves, means for setting said valves, said source including a primary pump geared to the driving transmission shaft and a secondary pump geared to the driven transmission shaft, at least one of said valves being a pump-selecting valve adapted to selectively connect said pumps to said conducting means, a lever settable to different positions allotted to different ratios of transmission, one of said valves being a ratio selector valve connected to said lever to be set thereby to any one of a plurality of positions, and a torque pressure controller adapted to control the pressure produced by said secondary pump and including an element movable to be indicative of the torque produced by the engine of the motor vehicle, said ratio selector valve, said pump selecting valve and said torque pressure controller cooperating to admit fluid under pressure from said secondary pump to the one of said clutches correlated to the lowest ratio of transmission, whereby said ratio will be made effective upon preselection by said lever when the torque produced by the engine exceeds a predetermined limit.

References Cited in the file of this patent

UNITED STATES PATENTS

| | | |
|---|---|---|
| 1,979,488 | Perez | Nov. 6, 1934 |
| 1,984,556 | Vetter | Dec. 18, 1934 |
| 2,103,540 | Livermore | Dec. 28, 1937 |
| 2,183,761 | Aspinwall et al. | Dec. 19, 1939 |
| 2,352,212 | Lang et al. | June 17, 1944 |
| 2,430,799 | Aspinwall | Nov. 11, 1947 |
| 2,449,608 | Le May | Sept. 21, 1948 |
| 2,511,039 | Black et al. | June 13, 1950 |
| 2,523,783 | Schjolin | Sept. 26, 1950 |
| 2,529,423 | Schou | Nov. 7, 1950 |
| 2,567,042 | Wemp | Sept. 4, 1951 |
| 2,591,342 | Dodge | Apr. 1, 1952 |
| 2,616,310 | Jandasek | Nov. 4, 1952 |
| 2,619,848 | Carnagua | Dec. 2, 1952 |
| 2,623,411 | Herndon | Dec. 30, 1952 |
| 2,627,189 | McFarland | Feb. 3, 1953 |
| 2,640,373 | Jandasek | June 2, 1953 |
| 2,689,029 | McFarland | Sept. 14, 1954 |